United States Patent
Sugizaki

(10) Patent No.: US 11,356,624 B2
(45) Date of Patent: Jun. 7, 2022

(54) SOLID-STATE IMAGING ELEMENT, SIGNAL PROCESSING CIRCUIT, AND ELECTRONIC EQUIPMENT

(71) Applicant: SONY SEMICONDUCTOR SOLUTIONS CORPORATION, Kanagawa (JP)

(72) Inventor: Taro Sugizaki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 379 days.

(21) Appl. No.: 16/330,646

(22) PCT Filed: Sep. 15, 2017

(86) PCT No.: PCT/JP2017/033525
§ 371 (c)(1),
(2) Date: Mar. 5, 2019

(87) PCT Pub. No.: WO2018/092400
PCT Pub. Date: May 24, 2018

(65) Prior Publication Data
US 2021/0281778 A1    Sep. 9, 2021

(30) Foreign Application Priority Data
Nov. 15, 2016   (JP) .............................. JP2016-222164

(51) Int. Cl.
*H04N 5/357*      (2011.01)
*H04N 5/232*      (2006.01)
*H04N 5/341*      (2011.01)

(52) U.S. Cl.
CPC ......... *H04N 5/357* (2013.01); *H04N 5/23229* (2013.01); *H04N 5/341* (2013.01)

(58) Field of Classification Search
CPC ..... H04N 5/357; H04N 5/23229; H04N 5/341
See application file for complete search history.

(56) References Cited

U.S. PATENT DOCUMENTS

2010/0141812 A1    6/2010   Hirota
2010/0231770 A1    9/2010   Honda et al.

FOREIGN PATENT DOCUMENTS

CN    101690242 A    3/2010
CN    101753863 A    6/2010
(Continued)

OTHER PUBLICATIONS

International Search Report and Written Opinion of PCT Application No. PCT/JP2017/033525, dated Nov. 21, 2017, 11 pages of ISRWO.

*Primary Examiner* — James M Hannett
*Assistant Examiner* — Angel L Garces-Rivera
(74) *Attorney, Agent, or Firm* — Chip Law Group

(57) ABSTRACT

A solid-state imaging element includes a pixel array in which a plurality of pixels having different spectral characteristics are arranged and one or more pixels of the plurality of pixels have a spectral characteristic that includes spectral characteristics of two or more pixels that are different from the one or more pixels. The solid-state imaging element further includes a signal processing unit that synthesizes signals of one or more pixels of the pixels that have the included spectral characteristics with a luminance signal, when a signal of a pixel that has two or more spectral characteristics in the pixel array is used to generate the luminance signal.

20 Claims, 23 Drawing Sheets

(56) References Cited

FOREIGN PATENT DOCUMENTS

| | | | |
|---|---|---|---|
| EP | 2194721 | A2 | 6/2010 |
| JP | 2004-282452 | A | 10/2004 |
| JP | 2008-306379 | A | 12/2008 |
| JP | 2010-136226 | A | 6/2010 |
| JP | 2016-054227 | A | 4/2016 |
| WO | 2008/150021 | A1 | 12/2008 |

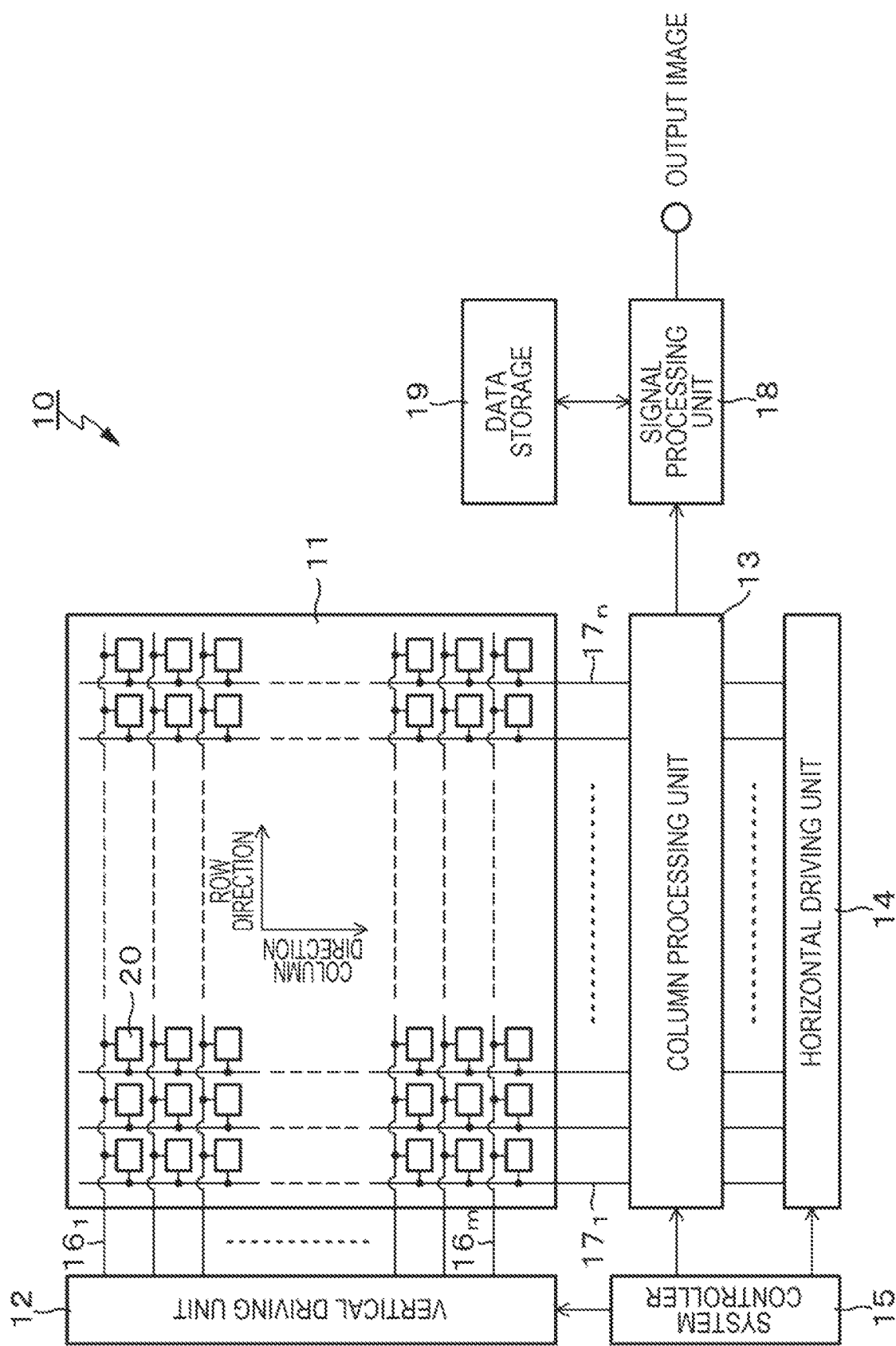

FIG. 2A
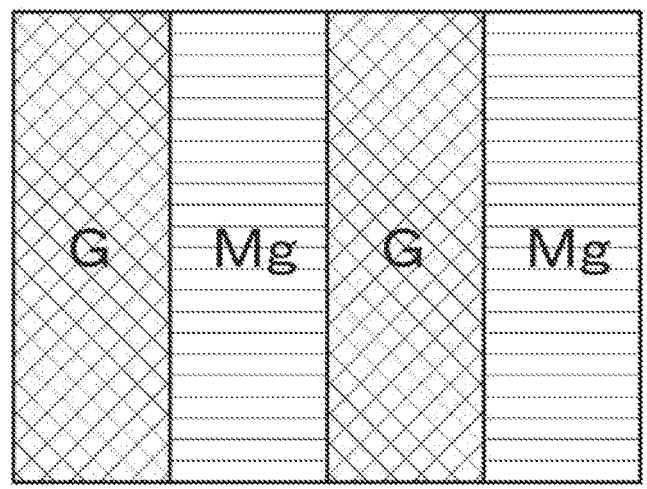
FIG. 2B
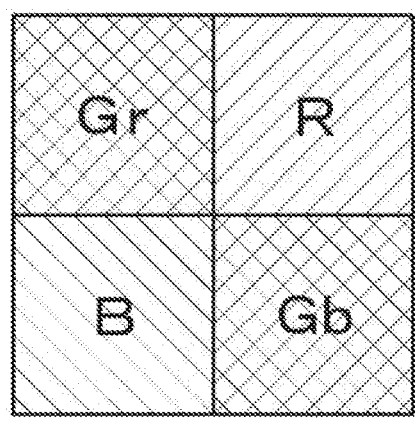
RGB BAYER ARRAY
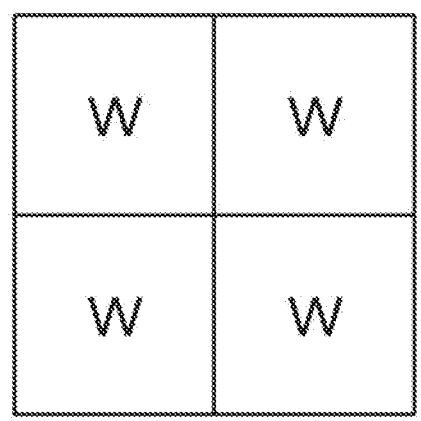
ARRAY IN WHICH ALL PIXELS ARE W PIXELS

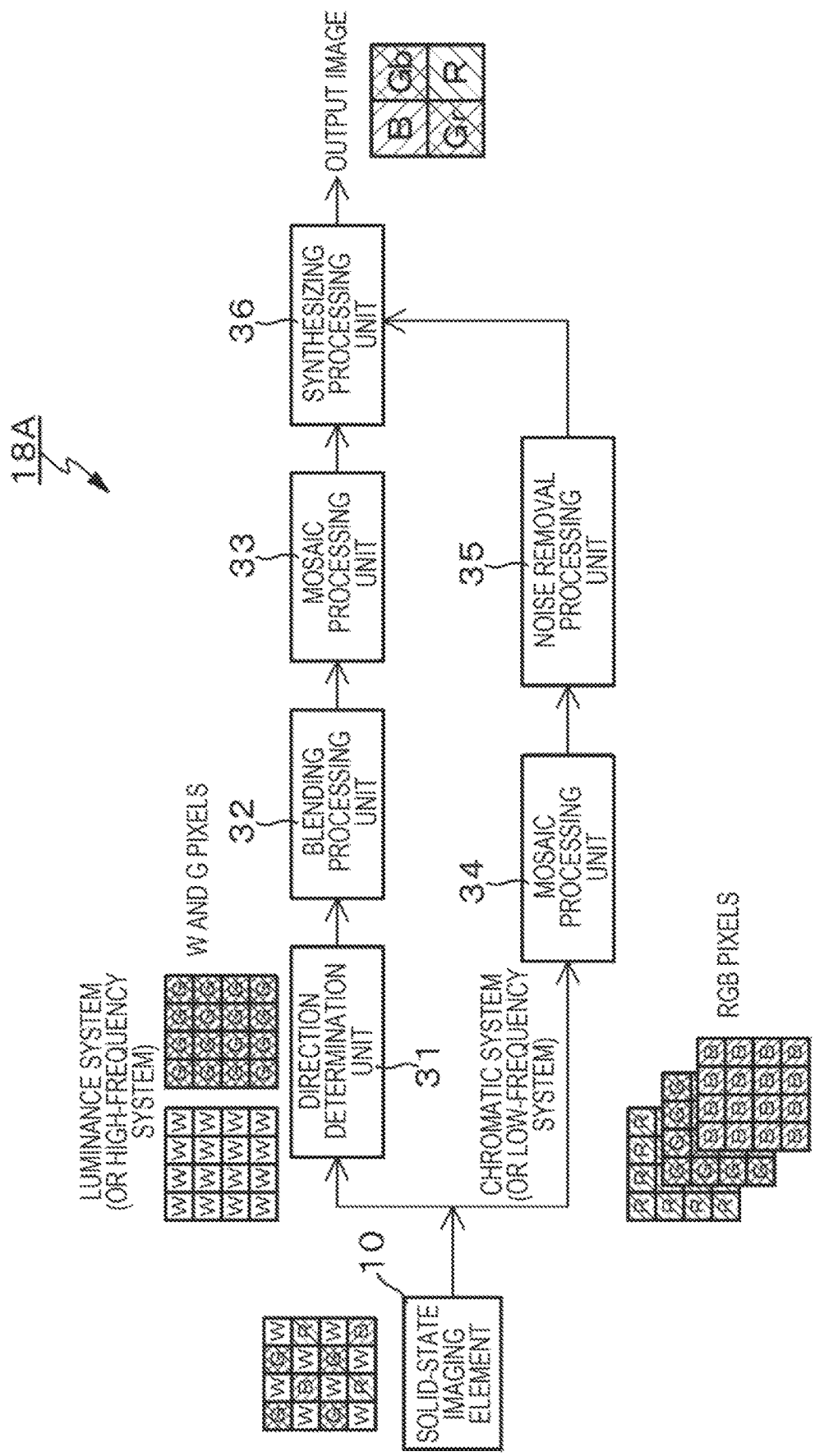

*FIG. 8A*

| G1 | W1 | G2 | W2 |
|---|---|---|---|
| W3 | B1 | W4 | R1 |
| G3 | W5 | G4 | W6 |
| W7 | R2 | W8 | B2 |

*FIG. 8B*

| Gr1 | W1 | R1 | W2 |
|---|---|---|---|
| W3 | Gb1 | W4 | B1 |
| R2 | W5 | Gr2 | W6 |
| W7 | B2 | W8 | Gb2 |

*FIG. 9A*

| Gr1 | W1 | R1 | W2 |
|---|---|---|---|
| W3 | Gr2 | W4 | R2 |
| B1 | W5 | Gb1 | W6 |
| W7 | B2 | W8 | Gb2 |

*FIG. 9B*

| R1 | W1 | R2 | W2 |
|---|---|---|---|
| G1 | B1 | G2 | B2 |
| R3 | W3 | R4 | W4 |
| G3 | B3 | G4 | B4 |

FIG. 11A

| G1 | Ye1 | G2 | Ye2 |
|----|-----|----|----|
| Ye3 | B1 | Ye4 | R1 |
| G3 | Ye5 | G4 | Ye6 |
| Ye7 | R2 | Ye8 | B2 |

FIG. 11B

| Gr1 | Ye1 | R1 | Ye2 |
|-----|-----|----|----|
| Ye3 | Gb1 | Ye4 | B1 |
| R2 | Ye5 | Gr2 | Ye6 |
| Ye7 | B2 | Ye8 | Gb2 |

FIG. 12A

| Gr1 | Ye1 | R1 | Ye2 |
|---|---|---|---|
| Ye3 | Gr2 | Ye4 | R2 |
| B1 | Ye5 | Gb1 | Ye6 |
| Ye7 | B2 | Ye8 | Gb2 |

FIG. 12B

| R1 | Ye1 | R2 | Ye2 |
|---|---|---|---|
| G1 | B1 | G2 | B2 |
| R3 | Ye3 | R4 | Ye4 |
| G3 | B3 | G4 | B4 |

*FIG. 13A*

| Yr1 | R1 | Yr2 | R2 |
|---|---|---|---|
| B1 | Yb1 | B2 | Yb2 |
| Yr3 | R3 | Yr4 | R4 |
| B3 | Yb3 | B4 | Yb4 |

*FIG. 13B*

| W | | Gr1 | R1 |
|---|---|---|---|
| | | B1 | Gb1 |
| Gr2 | R2 | Gr3 | R3 |
| B2 | Gb2 | B3 | Gb3 |

*FIG. 14A*

| a | W1 | b | W2 |
|---|----|---|----|
| W3 | c | W4 | d |
| e | W5 | f | W6 |
| W7 | g | W8 | h |

*FIG. 14B*

| a | G1 | b | G2 |
|---|----|---|----|
| R1 | c | B1 | d |
| e | G3 | f | G4 |
| B2 | g | R2 | h |

FIG. 16
W PIXEL
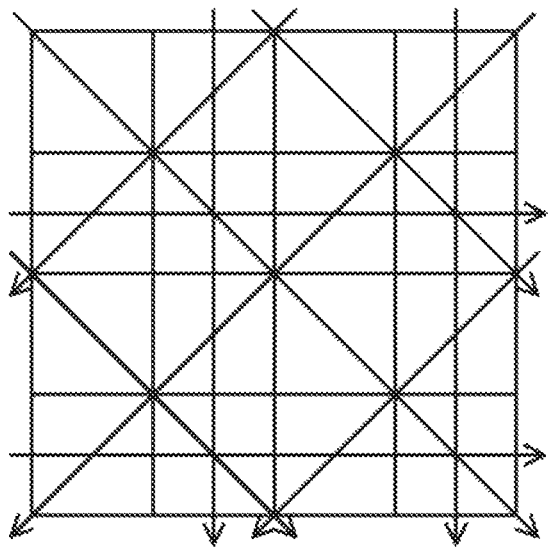
G PIXEL
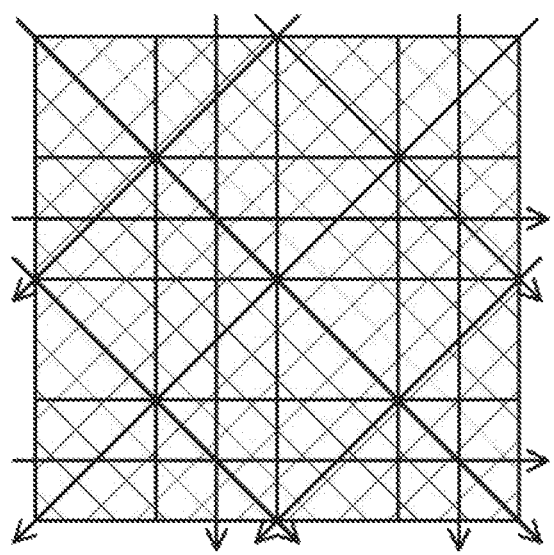

*FIG. 22*

SOLID-STATE IMAGING ELEMENT, SIGNAL PROCESSING CIRCUIT, AND ELECTRONIC EQUIPMENT

CROSS REFERENCE TO RELATED APPLICATIONS

This application is a U.S. National Phase of International Patent Application No. PCT/JP2017/033525 filed on Sep. 15, 2017, which claims priority benefit of Japanese Patent Application No. JP 2016-222164 filed in the Japan Patent Office on Nov. 15, 2016. Each of the above-referenced applications is hereby incorporated herein by reference in its entirety.

TECHNICAL FIELD

The present disclosure relates to a solid-state imaging element, a signal processing circuit, and electronic equipment.

BACKGROUND ART

In solid-state imaging elements such as charge coupled device (CCD) image sensors or complementary metal oxide semiconductor (CMOS) image sensors, the number of pixels has increased in order to improve resolution performance, but a pixel size has gradually been reduced. However, when the pixel size is reduced to a certain level, a sensitivity characteristic per pixel deteriorates, and therefore it is difficult to obtain a required sensitivity.

In view of this, an attempt has been made to improve a sensitivity by adding a white pixel (a W pixel) that receives light in the entirety of a visible light region to a combination of a red pixel (an R pixel) that receives red light, a green pixel (a G pixel) that receives green light, and a blue pixel (a B pixel) that receives blue light (see, for example, Patent Document 1).

CITATION LIST

Patent Document

Patent Document 1: Japanese Patent Application Laid-Open No. 2016-54227

SUMMARY OF THE INVENTION

Problems to be Solved by the Invention

Solid-state imaging elements that use the white pixel (the W pixel) have a high sensitivity and a high luminance resolution. On the other hand, light received by the white pixel includes signals in all of the wavelength regions, and therefore there is a problem in which a color resolution is reduced. The problem above of a reduction in the color resolution does not only arise in the solid-state imaging elements that use the white pixel, but also arises in solid-state imaging elements in general that use a pixel having a spectral characteristic that includes the spectral characteristics of pixels of a plurality of colors in order to improve a sensitivity.

It is an object of the present disclosure to provide a solid-state imaging element, a signal processing circuit, and electronic equipment that enable a reduction in a color resolution to be minimized even in a case where a pixel having a spectral characteristic that includes the spectral characteristics of pixels of a plurality of colors is used in order to improve a sensitivity.

Solutions to Problems

A solid-state imaging element of the present disclosure to achieve the object described above includes:

a pixel array in which a plurality of pixels having different spectral characteristics are arranged and one or more pixels of the plurality of pixels have a spectral characteristic that includes spectral characteristics of two or more pixels that are different from the one or more pixels; and a signal processing unit that synthesizes signals of one or more pixels of the pixels that have the included spectral characteristics with a luminance signal, when a signal of a pixel that has two or more spectral characteristics in the pixel array is used to generate the luminance signal. Furthermore, electronic equipment of the present disclosure to achieve the object described above includes the solid-state imaging element having the configuration above.

Furthermore, a signal processing circuit of the present disclosure to achieve the object described above is:

a signal processing circuit of a solid-state imaging element that includes a pixel array in which a plurality of pixels having different spectral characteristics are arranged and one or more pixels of the plurality of pixels have a spectral characteristic that includes spectral characteristics of two or more pixels that are different from the one or more pixels, and signals of one or more pixels that have the spectral characteristics included in the spectral characteristic of the one or more pixels are synthesized with a luminance signal, when a signal of a pixel that has two or more spectral characteristics in the pixel array is processed to generate the luminance signal.

Furthermore, another signal processing circuit of the present disclosure to achieve the object described above is:

a signal processing circuit that processes an output signal of a first solid-state imaging element and an output signal of a second solid-state imaging element, the first solid-state imaging element being configured by arranging pixels of a first color, the second solid-state imaging element being configured by arranging pixels of a second color, and when a luminance signal is generated, signals of the pixels of the first color and signals of the pixels of the second color are synthesized, the signals of the pixels of the first color being output from the first solid-state imaging element, the signals of the pixels of the second color being output from the second solid-state imaging element.

Effects of the Invention

According to the present disclosure, even in a case where a pixel having a spectral characteristic that includes the spectral characteristics of pixels of a plurality of colors is used in order to improve a sensitivity, a reduction in a color resolution can be minimized.

Note that the effect described here is not necessarily restrictive, and any of effects described herein may be exhibited. Furthermore, the effects described herein are only illustrative and are not restrictive, and additional effects may be exhibited.

BRIEF DESCRIPTION OF DRAWINGS

FIG. 1 is a system configuration diagram illustrating a basic configuration of a solid-state imaging element to which a technology of the present disclosure is applied.

FIGS. 2A and 2B are diagrams explaining a color resolution.

FIG. 7 is a block diagram illustrating an example of the configuration of a signal processing circuit in Example 1.

FIG. 8A illustrates a WRGB color array (no. 1), and FIG. 8B illustrates a WRGB color array (no. 2).

FIG. 9A illustrates a WRGB color array (no. 3), and FIG. 9B illustrates a WRGB color array (no. 4).

FIG. 11A illustrates a YeRGB color array (no. 1), and FIG. 11B illustrates a YeRGB color array (no. 2).

FIG. 12A illustrates a YeRGB color array (no. 3), and FIG. 12B illustrates a YeRGB color array (no. 4).

FIG. 13A illustrates a YeRB color array, and FIG. 13B illustrates a WRGB color array and illustrates an example in which the size of a W pixel is different from the sizes of the other pixels.

FIG. 14A illustrates a W+multi-spectral color array, and FIG. 14B illustrates an RGB+multi-spectral color array.

FIG. 15A illustrates a WRGB+partially multi-spectral color array, and FIG. 15B illustrates an RGB+partially multi-spectral color array.

FIG. 16 is a diagram explaining direction determination of a direction determination unit.

FIG. 20 illustrates a combination (no. 1) of pixel arrays of two solid-state imaging elements in Example 2.

FIG. 21 illustrates a combination (no. 2) of pixel arrays of two solid-state imaging elements in Example 2.

FIG. 22 illustrates a combination (no. 3) of pixel arrays of two solid-state imaging elements in Example 2.

MODE FOR CARRYING OUT THE INVENTION

Figure 3A:
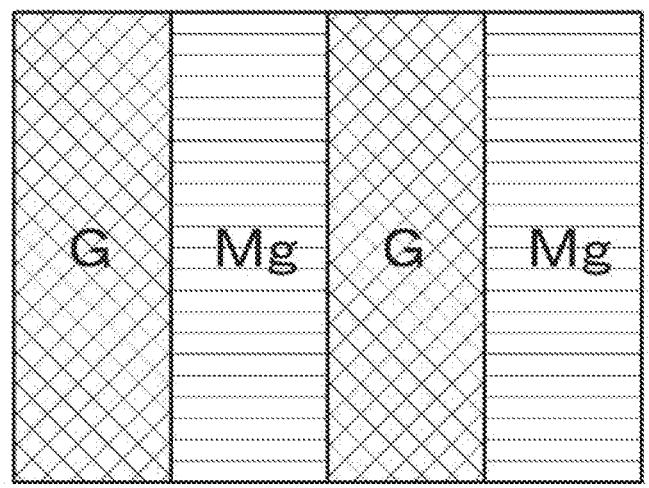
FIGS. 3A and 3B illustrate examples of outputs of an R pixel, a G pixel, and a B pixel and an output of a W pixel in the case of the subject illustrated in FIG. 2A.

A mode for carrying out a technology of the present disclosure (hereinafter referred to as an "embodiment") is described below in detail with reference to the drawings. The technology of the present disclosure is not limited to the embodiment. In the description below, it is assumed that the same element or elements that have the same function are denoted by the same reference sign, and a duplicate description is omitted. Note that a description will be given in the order described below.

1. General description relating to solid-state imaging element, signal processing circuit, and electronic equipment of the present disclosure
2. Solid-state imaging element to which technology of the present disclosure is applied
  2-1. Basic system configuration
  2-2. Color resolution
3. Embodiment of the present disclosure
  3-1. Example 1 (example in the case of one solid-state imaging element)
  3-2. Example 2 (example in the case of two solid-state imaging elements)
4. Electronic equipment
5. Configuration that the present disclosure can employ <General Description Relating to Solid-State Imaging Element, Signal Processing Circuit, and Electronic Equipment of the Present Disclosure>

A solid-state imaging element, a signal processing circuit, and electronic equipment of the present disclosure can have a configuration in which a pixel array includes at least a pixel of a first color and a pixel of a second color. Then, a signal processing unit can be configured to synthesize a signal of the pixel of the first color and a signal of the pixel of the second color in signal processing of a luminance system. Furthermore, the signal processing unit can be configured to perform alpha blending processing on the signal of the pixel of the first color and the signal of the pixel of the second color by using an alpha value.

In the solid-state imaging element, the signal processing circuit, and the electronic equipment of the present disclosure including the preferred configurations described above, it is preferable that the pixel of the first color be a white pixel for which the number of pixels is the largest (or a sampling rate is the highest) in the pixel array and that receives light in the entirety of a visible light region. Furthermore, it is preferable that the pixel of the second color be a green pixel for which the number of pixels is the second largest (or the sampling rate is the second highest) following the white pixel and that receives green light.

Furthermore, the solid-state imaging element, the signal processing circuit, and the electronic equipment of the present disclosure including the preferred configurations described above can have a configuration in which one or more pixels of the second color are included in a multi-spectral pixel array having four types (four colors) or more of wavelength resolving power in a wavelength direction.

Moreover, the solid-state imaging element, the signal processing circuit, and the electronic equipment of the present disclosure including the preferred configurations described above can have a configuration in which the signal processing unit includes a direction determination unit that determines an edge direction in which a pixel value discontinuously changes, and specifies a ratio of a signal that will be synthesized with a luminance signal on the basis of a determination result of the determination unit.

Moreover, the solid-state imaging element, the signal processing circuit, and the electronic equipment of the present disclosure including the preferred configurations described above can have a configuration in which the signal processing unit performs mosaic processing after synthesizing processing performed on the luminance signal in the signal processing of the luminance system.

Moreover, the solid-state imaging element, the signal processing circuit, and the electronic equipment of the present disclosure including the preferred configurations described above can have a configuration in which the pixel array includes a red pixel that receives red light, a green pixel that receives green light, and a blue pixel that receives blue light. Then, the signal processing unit can be configured to perform mosaic processing based on respective signals of the red pixel, the green pixel, and the blue pixel in the signal processing of a chromatic system.

Moreover, the solid-state imaging element, the signal processing circuit, and the electronic equipment of the present disclosure including the preferred configurations described above can have a configuration in which the signal processing unit performs noise removal processing after the mosaic processing in the signal processing of the chromatic system. Moreover, the signal processing unit can be configured to perform synthesizing processing on a signal of the luminance system and a signal of the chromatic system.

<Solid-State Imaging Element to which Technology of the Present Disclosure is Applied>

A solid-state imaging element to which a technology of the present disclosure is applied is described with reference to FIG. 1. FIG. 1 is a system configuration diagram illustrating a basic configuration of a solid-state imaging element to which the technology of the present disclosure is applied. Here, a description is given by using a CMOS image sensor that is a kind of an X-Y address type solid-state imaging element as an example of a solid-state imaging element in this application example. However, the technology of the present disclosure is not always applied to the CMOS image sensor, but is applicable, for example, to a CCD image sensor.

[Basic System Configuration]

A solid-state imaging element 10 in this application example includes a pixel array 11 that has been formed on a not-illustrated semiconductor substrate (a semiconductor chip), and a peripheral circuit that has been integrated on the same semiconductor substrate as the semiconductor substrate of the pixel array 11. The peripheral circuit is configured, for example, by a vertical driving unit 12, a column processing unit 13, a horizontal driving unit 14, and a system controller 15.

The solid-state imaging element 10 further includes a signal processing unit 18 and a data storage 19. The signal processing unit 18 and the data storage 19 may be mounted on the same substrate as the substrate of the solid-state imaging element 10, or may be arranged on a substrate that is different from the substrate of the solid-state imaging element 10. Furthermore, processing of each of the signal processing unit 18 and the data storage 19 may be processing performed by an external signal processing unit, such as a digital signal processor (DSP) circuit or software, that is provided on the substrate that is different from the substrate of the solid-state imaging element 10.

The pixel array 11 performs optical-to-electrical conversion so as to generate a photocharge according to an amount of received incident light, and has a configuration in which pixels 20 including an optical-to-electrical converter for storage are two-dimensionally arranged in a row direction and a column direction and in other words, in matrix. Here, the row direction refers to an arraying direction of pixels (unit pixels) in a pixel row (in other words, a horizontal direction), and the column direction refers to an arraying direction of pixels in a pixel column (in other words, a vertical direction).

In the pixel array 11, pixel driving lines 16 ($16_1$ to $16_m$) are wired in the row direction to the respective pixel rows in matrix-shaped pixel arraying, and vertical signal lines 17 ($17_1$ to $17_n$) are wired in the column direction to the respective pixel columns. The pixel driving line 16 transmits a driving signal that has been output from the vertical driving unit 12, when the pixels 20 are driven. In FIG. 1, the pixel driving line 16 is illustrated as a single wire, but is not limited to a single wire. One end of the pixel driving line 16 is connected to an output end that corresponds to each of the rows of the vertical driving unit 12.

The vertical driving unit 12 is configured by a shift register, an address decoder, or the like, and simultaneously drives all of the pixels 20 of the pixel array 11 or drives the respective pixels 20 in row units or the like. In other words, the vertical driving unit 12, together with the system controller 15 that controls the vertical driving unit 12, configures a driving unit that drives the respective pixels 20 of the pixel array 11. A specific configuration of this vertical driving unit 12 is not illustrated, but in general, the vertical driving unit 12 includes two scanning systems, a reading scanning system and a sweeping scanning system.

The reading scanning system sequentially and selectively scans the pixels 20 of the pixel array 11 in row units in order to read signals from the pixels 20. The signal that has been read from the pixel 20 is an analog signal. The sweeping scanning system performs sweeping scanning on a read row on which the reading scanning system will perform reading scanning earlier by a time period of a shutter speed than reading scanning.

The sweeping scanning system performs sweeping scanning, so that an unnecessary charge is swept out from the optical-to-electrical converter of the pixel 20 in the read row, and this causes the optical-to-electrical converter to be reset. Then, the sweeping scanning system sweeps out (resets) the unnecessary charge, so that what is called an electronic shutter operation is performed. Here, the electronic shutter operation refers to an operation to discard a photocharge of the optical-to-electrical converter and newly start exposure (start storing a photocharge).

A signal that is read in a reading operation performed by the reading scanning system corresponds to an amount of light that has been received after a most recent reading operation or the electronic shutter operation. Then, a period from a reading timing in the most recent reading operation or a sweeping timing in the electronic shutter operation to a reading timing in a current reading operation is an exposure period of a photocharge of the pixel 20.

Signals that have been output from respective pixels 20 in a pixel row that has been selectively scanned by the vertical driving unit 12 are input in pixel column units via the respective vertical signal lines 17 to the column processing unit 13. The column processing unit 13 performs prescribed signal processing in pixel column units of the pixel array 11 on signals that have been output from respective pixels 20 in a selected row via the vertical signal lines 17, and temporarily holds pixel signals after signal processing.

Specifically, the column processing unit 13 performs, as signal processing, at least noise removal processing such as correlated double sampling (CDS) processing or double data sampling (DDS) processing. For example, in CDS processing, reset noise or fixed pattern noise peculiar to a pixel, such as variations in the threshold of an amplification transistor in the pixel 20 is removed. The column processing unit 13 can have, for example, an analog-digital (AD) conversion function in addition to noise removal processing so as to convert an analog pixel signal to a digital signal and output the digital signal.

The horizontal driving unit 14 is configured by a shift register, an address decoder, or the like, and sequentially selects a unit circuit that corresponds to a pixel column of the column processing unit 13. The horizontal driving unit 14 performs selective scanning, as described above, so that a pixel signal on which signal processing has been performed for each of the unit circuits in the column processing unit 13 is sequentially output.

The system controller 15 is configured by a timing generator that generates various timing signals, or the like, and performs driving control on the vertical driving unit 12, the column processing unit 13, the horizontal driving unit 14, and the like on the basis of various timings generated by the timing generator.

The signal processing unit 18 has at least an arithmetic processing function, and performs various types of signal processing such as arithmetic processing on a pixel signal that has been output from the column processing unit 13. The signal processing unit 18 is an example of a signal processing circuit of the present disclosure, and details of the signal processing unit 18 will be described later. The data storage 19 temporarily stores data that is needed in signal processing performed by the signal processing unit 18.

Note that the system configuration described above is an example and is not restrictive. For example, a system configuration may be employed in which the data storage 19 is arranged in a rear stage of the column processing unit 13 and a pixel signal output from the column processing unit 13 is supplied via the data storage 19 to the signal processing unit 18. Alternatively, a system configuration may be employed in which the column processing unit 13 has an AD conversion function for performing AD conversion on each column or each plurality of columns of the pixel array 11 and the data storage 19 and the signal processing unit 18 are provided in parallel with respect to the column processing unit 13.

The solid-state imaging element 10 to which the technology of the present disclosure is applied can employ, as a structure, what is called a flatly placing structure in which components such as the column processing unit 13, the signal processing unit 18, or the data storage 19, together with the pixel array 11, are mounted on the same semiconductor substrate. Alternatively, what is called a laminated structure can be employed in which components such as the column processing unit 13, the signal processing unit 18, or the data storage 19 are dispersedly mounted on one or more semiconductor substrates that are different from a semiconductor substrate on which the pixel array 11 is mounted and these semiconductor substrates are laminated.

Furthermore, as a pixel structure, a reverse-surface irradiation type pixel structure can be employed, or a front-surface irradiation type pixel structure can be employed. Here, the "reverse-surface irradiation type pixel structure" refers to a pixel structure in which, when a surface on a side on which a wiring layer of a semiconductor substrate is formed is assumed to be a substrate front surface, incident light is taken in (light is applied) from a surface on a reverse side, in other words, from a side of a substrate reverse surface (a reverse side of the semiconductor substrate). In contrast, the "front-surface irradiation type pixel structure" refers to a pixel structure in which incident light is taken in (light is applied) from a side of the substrate front surface.

[Color Resolution]

Here, a color resolution is examined that expresses the intensities of the basic colors "red, green, and blue", which are three primary colors of light, in a solid-state imaging element. There is a problem in which solid-state imaging elements that use a white pixel (a W pixel) that receives light in the entirety of a visible light region have a high sensitivity and a high luminance resolution, but the light received by the white pixel includes signals of all of the wavelength regions, and therefore the solid-state imaging elements have a low color resolution. This respect is described below by using specific examples. As an example, a case is examined in which a subject in which a G band and a Mg (magenta) band are alternately arranged, as illustrated in FIG. 2A, is imaged. Here, it is assumed that a G subject and a Mg subject have the same luminance level.

First, a case is examined in which a color array of pixels (a color filter) is an RGB Bayer array illustrated on a left-hand side of FIG. 2B. The RGB Bayer array is based on an array pattern that uses four pixels, an R pixel, a B pixel, and two G (Gr, Gb) pixels as a unit. Here, the R pixel is a pixel that includes a red color filter layer so as to receive red light. The G pixel is a pixel that includes a green color filter layer so as to receive green light. The B pixel is a pixel that includes a blue color filter layer so as to receive blue light. The Gr pixel means a G pixel in a pixel row that includes the R pixel, and the Gb pixel means a G pixel in a pixel row that includes the B pixel.

In the case of this RGB Bayer array, the G pixel indicates a large output value with respect to the G subject, as illustrated in FIG. 3A. Assume, for example, that an output of the G pixel is 500 LSB@10 bit and mixed color is ignored. Outputs of the R pixel and the B pixel are 0 LSB@10 bit. Then, with respect to a Mg subject, an output of the G pixel is 0 LSB@10 bit, and outputs of the R pixel and the B pixel are 500 LSB@10 bit. As described above, the respective outputs of the G pixel, the R pixel, and the B pixel are different between the G subject and the Mg subject, and this enables an actual subject to be reproduced.

Figure 3B:
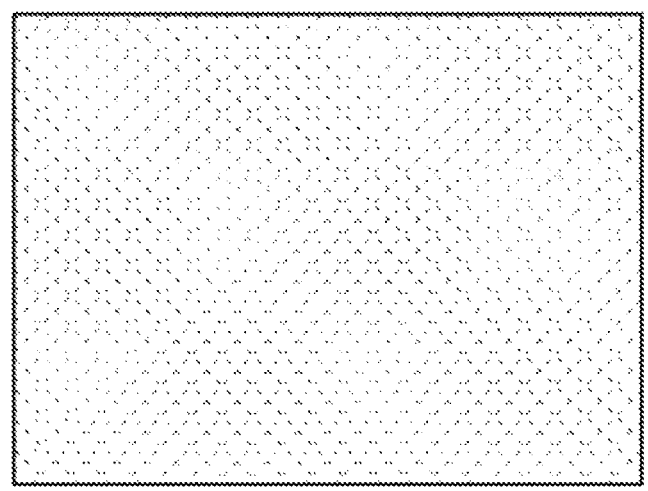

Next, a case is examined in which all of the pixels are W pixels (monochrome), as illustrated on a right-hand side of FIG. 2B. In the case of an array in which all of the pixels are W pixels, an output of the W pixel is, for example, 600 LSB@10 bit with respect to both the G subject and the Mg subject, as illustrated in FIG. 3B. In this case, the same subject appears over the entire surface, and this causes a problem in which a boundary between the G subject and the Mg subject fails to be recognized. A case where the luminance values of the G subject and the Mg subject when viewed from the W pixel are exactly the same as each other has been described above. However, when the luminance values are not the same as each other but are similar to a certain level, a resolution is reduced in a solid-state imaging element in which all of the pixels are W pixels. When the luminance values are the same as each other, resolution is not performed in principle. Therefore, a reduction in a color resolution is a phenomenon that may occur when the luminance values are the same as each other or are similar to each other regardless of a color combination, whatever colors are combined.

Figure 4A:
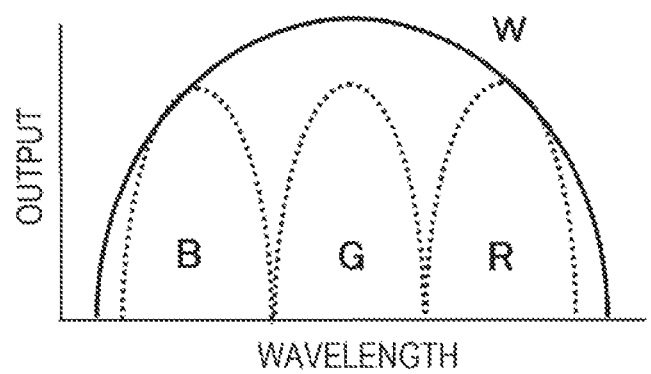
FIG. 4A illustrates an example of a spectral characteristic in the case of a WRGB color array.
Figure 4B:
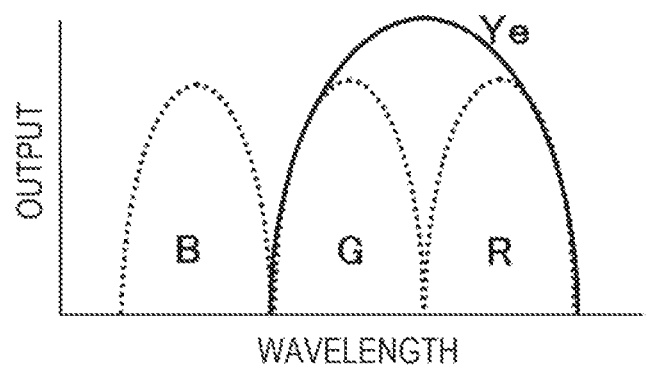
FIG. 4B illustrates an example of a spectral characteristic in the case of a YeRGB color array.
Figure 4C:
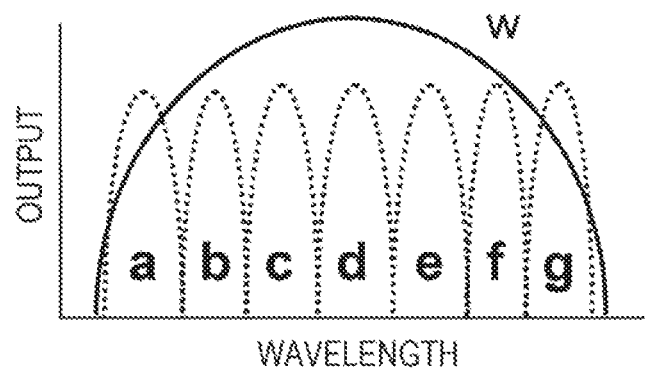
FIG. 4C illustrates an example of a spectral characteristic in the case of a W+multi-spectral color array.
Figure 5A:
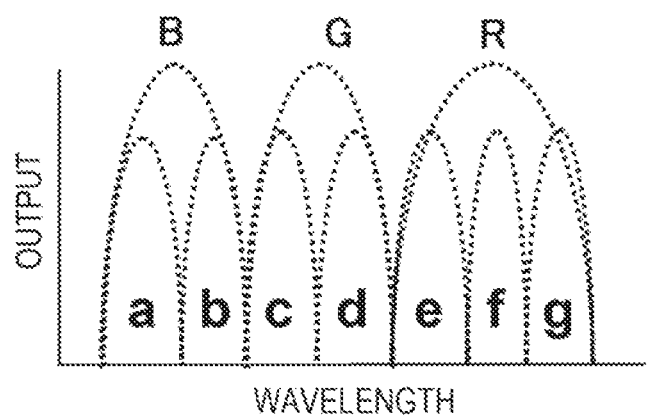
FIG. 5A illustrates an example of a spectral characteristic in the case of an RGB+multi-spectral color array.
Figure 5B:
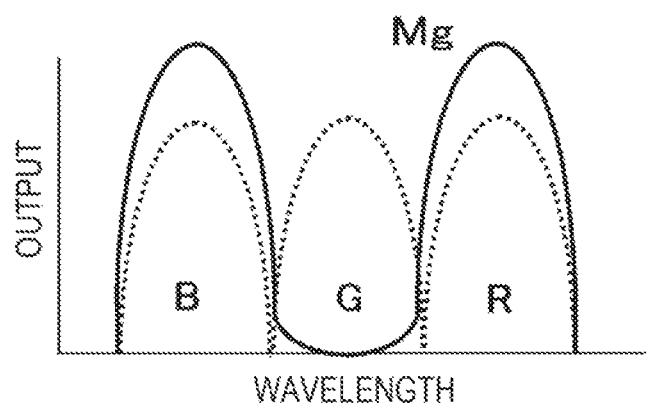
FIG. 5B illustrates an example of a spectral characteristic in the case of an RGB+Mg color array.

The color resolution is described in more detail by using various spectral characteristics. FIG. 4A illustrates an example of a spectral characteristic in the case of a WRGB color array, FIG. 4B illustrates an example of a spectral characteristic in the case of a Ye (yellow) RGB color array, and FIG. 4C illustrates an example of a spectral characteristic in the case of a W+multi-spectral color array. FIG. 5A illustrates an example of a spectral characteristic in the case of an RGB+multi-spectral color array, and FIG. 5B illustrates an example of a spectral characteristic in the case of an RGB+Mg color array. Here, a multi-spectrum refers to a spectrum having four types (four colors) or more of wavelength resolving power in a wavelength direction.

In the case of the WRGB color array illustrated in FIG. 4A, a spectral characteristic of the W pixel has a form that includes respective spectral characteristics of the R pixel, the G pixel, and the B pixel. In this case, in a case where the luminance values of subjects of respective RGB colors when viewed from the W pixel are the same as each other or are similar to each other, the respective RGB colors fail to be distinguished from each other, and resolution is not performed. Similarly in a case where the respective RGB colors are mixed, subjects that have the same luminance value or a similar luminance value when viewed from the W pixel are not resolved.

In the case of the YeRGB color array illustrated in FIG. 4B, a spectral characteristic of a Ye (yellow) pixel has a form that includes respective spectral characteristics of the R pixel and the G pixel. In this case, in a case where the luminance values of subjects of respective RG colors when viewed from the Ye pixel are the same as each other or are similar to each other, the respective RG colors fail to be distinguished from each other, and resolution is not performed. Similarly in a case where the respective RG colors are mixed, subjects that have the same luminance value or a similar luminance value when viewed from the Ye pixel are not resolved.

In the case of the W+multi-spectral color array illustrated in FIG. 4C, a spectral characteristic of the W pixel has a form that includes respective spectral characteristics of an a pixel to a g pixel. Here, a to g mean arbitrary colors. In this case, in a case where the luminance values of subjects of two or more colors of respective colors, a to g, when viewed from the W pixel are the same as each other or are similar to each other, subjects of respective colors that have the same luminance value or a similar luminance value fail to be distinguished from each other, and are not resolved. Similarly in a case where the respective colors, a to g, are mixed, subjects that have the same luminance value or a similar luminance value when viewed from the W pixel are not resolved.

In the case of the RGB+multi-spectral color array illustrated in FIG. 5A, a spectral characteristic of the B pixel has a form that includes respective spectral characteristics of the a pixel and the b pixel, a spectral characteristic of the G pixel has a form that includes respective spectral characteristics of the c pixel and the d pixel, and a spectral characteristic of the R pixel has a form that includes respective spectral characteristics of the e pixel, the f pixel, and the g pixel. In this case, in a case where the luminance values of subjects of respective ab colors when viewed from the B pixel are the same as each other or are similar to each other, in a case where the luminance values of subjects of respective cd colors when viewed from the G pixel are the same as each other or are similar to each other, and in a case where the luminance values of subjects of respective efg colors when viewed from the R pixel are the same as each other or are similar to each other, these subjects are not resolved.

In the case of the RGB+Mg color array illustrated in FIG. 5B, a spectral characteristic of a Mg (magenta) pixel has a form that includes respective spectral characteristics of the B pixel and the R pixel. In this case, in a case where the luminance values of subjects of respective BR colors when viewed from the Mg pixel are the same as each other or are similar to each other, the respective BR colors fail to be distinguished from each other, and resolution is not performed. Similarly in a case where the respective BR colors are mixed, subjects that have the same luminance value or a similar luminance value when viewed from the Mg pixel are not resolved.

This is similarly applicable to the case of a RGB+Cy (cyan) color array, but this color array is not illustrated. In this case, in a case where the luminance values of subjects of respective BG colors when viewed from a Cy (cyan) pixel are the same as each other or are similar to each other, the respective BG colors fail to be distinguished from each other, and resolution is not performed. Similarly in a case where the respective BG colors are mixed, subjects that have the same luminance value or a similar luminance value when viewed from the Cy pixel are not resolved.

As described above, in a case where there is a filter that has a color array having a plurality of spectral characteristics and one or more spectral characteristics of the plurality of spectral characteristics include two or more spectral characteristics that are different from the one or more spectral characteristics, when the luminance values of included colors are the same as each other or are similar to each other, a pixel that includes the two or more spectral characteristics fails to perform distinguishing, and fails to perform resolution (a reduction in the color resolution).

Here, the definition of the meaning of to "include" a spectral characteristic is described with reference to FIGS. 6A and 6B.

Figure 6A:
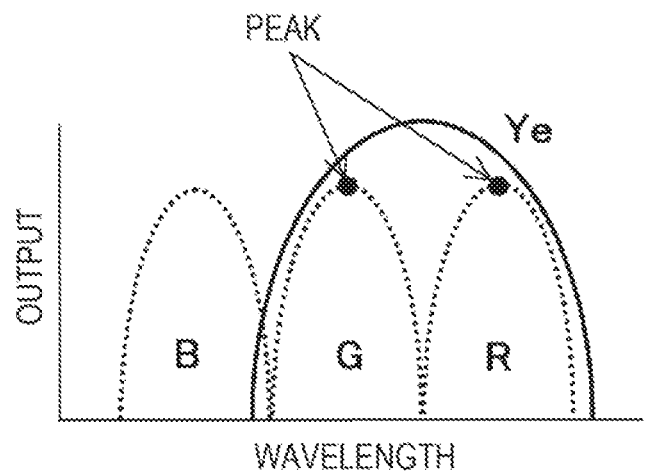
FIGS. 6A and 6B are diagrams explaining the definition of the meaning of to "include" a spectral characteristic.
Figure 6B:
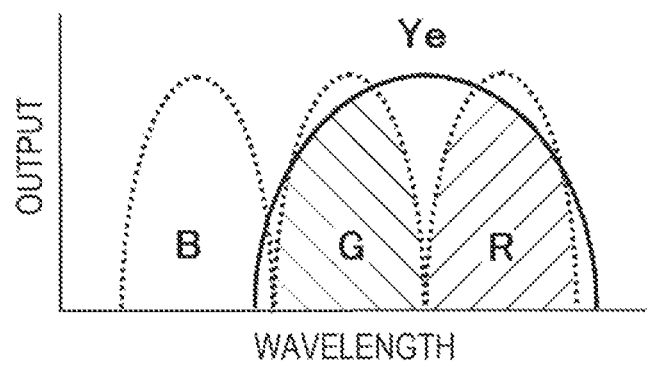

As illustrated in FIG. 6A, for example, a case where a spectral characteristic of the Ye pixel includes peak values of two spectral characteristics (in this case, respective spectral characteristics of the G pixel and the R pixel) is defined as to "include". Furthermore, as illustrated in FIG. 6B, a case where a peak value is not included but, for example, half or more of the area of a waveform of a spectral characteristic is included is defined as to "include". Of course, a case where, from among the waveforms of two spectral characteristics, a peak value of one spectral characteristic and, for example, half or more of the area of a waveform of the other spectral characteristic are included is also defined as to "include". This is similarly applicable to the case of the waveforms of three or more spectral characteristics, and a case where a peak value or, for example, half or more of an area is included is defined as to "include".

Embodiment of the Present Disclosure

In an embodiment of the present disclosure, in order to minimize a deterioration of a color resolution, it is assumed that a plurality of pixels having different spectral characteristics are arranged as respective pixels of the pixel array 11 of the solid-state imaging element 10 and one or more pixels of the plurality of pixels have a spectral characteristic that includes the spectral characteristics of two or more pixels that are different from the one or more pixels.

Here, a specific description is given by using the case of the WRGB color array illustrated in FIG. 4A as an example in order to facilitate understanding. In the case of the WRGB color array, one or more pixels of the plurality of pixels are W pixels, and the spectral characteristics of two or more pixels that are different from the one or more pixels are respective spectral characteristics of the R pixel, the G pixel, and the B pixel. In other words, as clearly illustrated in FIG. 4A, the W pixel has a spectral characteristic that includes the spectral characteristics of the two or more pixels that are different from the one or more pixels, in other words, the respective spectral characteristics of the R pixel, the G pixel, and the B pixel.

Furthermore, when the case of the RGB+multi-spectral color array illustrated in FIG. 5A is used as an example, the one or more pixels are three pixels, the R pixel, the G pixel, and the B pixel. Then, as clearly illustrated in FIG. 5A, the B pixel has a spectral characteristic that includes the spectral characteristics of two pixels, the a pixel and the b pixel, the G pixel has a spectral characteristic that includes the spectral characteristics of two pixels, the c pixel and the d pixel, and the R pixel has a spectral characteristic that includes the spectral characteristics of three pixels, the e pixel, the f pixel, and the g pixel.

In the solid-state imaging element 10 that includes the pixel array 11 including a color filter having the color array described above, the signal processing unit 18 illustrated in FIG. 1 performs processing for generating a luminance signal by processing a signal of a pixel having two or more spectral characteristics in the pixel array 11. At this time, the signal processing unit 18 synthesizes signals of one or more pixels of pixels having the included spectral characteristics with the luminance signal.

When the case of the WRGB color array illustrated in FIG. 4A is used as an example, the W pixel is a pixel of a first color, the G pixel that has a spectral characteristic included in the spectral characteristic of the W pixel is a pixel of a second color, and a luminance signal (a high-frequency signal) is generated by synthesizing respective signals of the W pixel and the G pixel. As described above, a spectral characteristic is improved by using the W pixel and the G pixel that has a spectral characteristic included in the spectral characteristic of the W pixel so as to generate a signal of a luminance system, and therefore even in a case where the W pixel is used in order to improve a sensitivity, a reduction in a color resolution can be minimized.

In the description above, as an example, the W pixel is used as the pixel of the first color, and the G pixel is used as the pixel of the second color. However, a combination of these colors is not restrictive.

The signal processing unit 18 that has the configuration above is a signal processing circuit according to the embodiment of the present disclosure, and the solid-state imaging element 10 that includes the signal processing unit 18 is a solid-state imaging element according to the embodiment of the present disclosure. Note that, in the present embodiment, a configuration is employed in which the signal processing circuit according to the present embodiment (the signal processing unit 18) that has the configuration above is provided inside the solid-state imaging element 10, but a configuration can also be employed in which the signal processing circuit according to the present embodiment is provided outside the solid-state imaging element 10.

The signal processing circuit according to the present embodiment is descried below in detail. As an example, a signal that is input to the signal processing circuit according to the present embodiment may be given from a single solid-state imaging element that is configured by arranging respective WRGB pixels, or may be given from two solid-state imaging elements, a solid-state imaging element that is configured by arranging respective RGB pixels and a monochrome solid-state imaging element that is configured by only arranging W pixels. A specific description is given below by using the former as a signal processing circuit in Example 1 and using the latter as a signal processing circuit in Example 2.

Example 1

Example 1 is an example in a case where a single solid-state imaging element serving as an input sensor is used. An example of the configuration of a signal processing circuit 18A in Example 1 is illustrated in FIG. 7. Here, as an example, a color array of pixels indicates the WRGB color array illustrated in FIG. 8A.

An imaging signal is input to the signal processing circuit 18A in Example 1 from a single solid-state imaging element 10 that is configured by arranging respective WRGB pixels. Note that this form indicates a case where the signal processing circuit 18A is arranged outside the solid-state imaging element 10. In a case where the signal processing circuit 18A is arranged inside the solid-state imaging element 10, the imaging signal is input from a pixel array 11 that is configured by arranging respective RGBW pixels via the column processing unit 13 (see FIG. 1).

The signal processing circuit 18A in Example 1 includes a luminance system serving as a high-frequency system and a chromatic system serving as a low-frequency system. Here, assume that a signal of the W pixel for which the number of the pixels is the largest in the pixel array 11 and respective signals of the G pixels for which the number of pixels is the second largest are used as a signal of the luminance system. Furthermore, assume that respective signals of three or more types of pixels that enables color reproduction and specifically, the G pixel, the R pixel, and the B pixel are used as a signal of the chromatic system.

In the luminance system, both a pixel of a color for which the number of pixels is the largest (a sampling frequency is the highest) and a pixel for which the number of pixels is the second largest and that has a color resolution (a wavelength resolving power) are needed. Accordingly, in signal processing of the luminance system, the W pixel for which the number of pixels is the largest (or a sampling rate is the highest) in the pixel array 11 is used as the pixel of the first color, and the G pixels for which the number of pixels is the second largest (or the sampling rate is the second highest) following the W pixel is used as the pixel of the second color. Then, a signal of the W pixel and a signal of the G pixel are synthesized at a prescribed ratio. The W pixel is a pixel that has the highest sensitivity, and the G pixel is a pixel that has the second highest sensitivity following the W pixel.

Examples of a color array of respective WRGB pixels include color arrays (no. 2, no. 3, and no. 4) of the types illustrated in FIGS. 8B, 9A, and 9B in addition to the color array (no. 1) illustrated in FIG. 8A. Furthermore, examples other than a WRGB color array are the WRB color array illustrated in FIG. 10A, the WRG color array illustrated in FIG. 10B, the WYeMgCy color array illustrated in FIG. 10C, and the like.

Figure 10A:
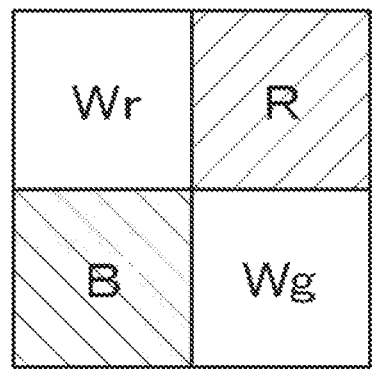
FIG. 10A illustrates a WRB color array.
Figure 10B:
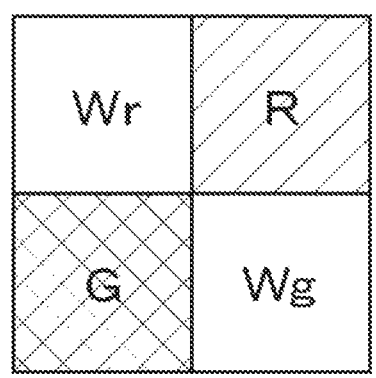
FIG. 10B illustrates a WRG color array.
Figure 10C:
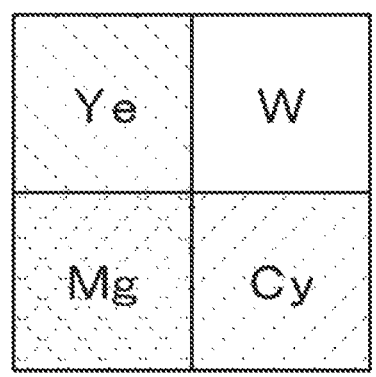
FIG. 10C illustrates a WYeMgCy color array.

In the case of the WRB color array illustrated in FIG. 10A, a virtual G pixel may be generated (G=W−R−B), and the virtual G pixel may be used as a luminance system (a high-frequency system) of the second color. Also in the WRG color array illustrated in FIG. 10B, in a case where the B pixel is used as the pixel of the second color, a virtual B pixel may be similarly generated (B=W−G−R), and the virtual B pixel may be used as the pixel of the second color.

Examples of a color array of pixels include the following color arrays in addition to the color arrays described above.

The color arrays illustrated in FIGS. 11A, 11B, 12A, and 12B are examples of a YeRGB color array (no. 1, no. 2, no. 3, and no. 4), and are different in arraying from each other. In the case of this YeRGB color array, for example, a Ye pixel having the highest sensitivity is used as the pixel of the first color instead of the W pixel. In this case, the spectral characteristic of the Ye pixel includes the spectral characteristic of the G pixel (see FIG. 4B), and therefore a resolution is reduced in a case where outputs of the Ye pixel with respect to subjects of R color and G color have the same luminance value or a similar luminance value. Accordingly, in processing of the luminance system (or the high-frequency system), a signal of the G pixel or a signal of the R pixel, or signals of both pixels may be used as a signal of the pixel of the second color.

The color array illustrated in FIG. 13A is an example of a YeRB color array. In the YeRB color array, in a case where a signal of the G pixel is used, a virtual G pixel may be generated (G=Ye−R), and the virtual G pixel may be used as a luminance system of the second color. The color array illustrated in FIG. 13B is a WRGB color array, and is an example in which the size of the W pixel is different from the sizes of the other pixels. A case where the size of the W pixel is different from the sizes of the other pixels has been described here, but the W pixel is not restrictive, and the size of one of the RGB pixels or the sizes of two or more pixels may be different from the sizes of the other pixels.

The color array illustrated in FIG. 14A is an example of a W-pixel+multi-spectral color array, and the color array illustrated in FIG. 14B is an example of an RGB+multi-spectral color array. Here, as an example, a multi-spectrum of eight colors, a, b, c, d, e, f, g, and h, is illustrated, but the number of colors, a resolving power in a wavelength direction, and the arrangement of pixels are not limited to these, and any multi-spectral color array having resolving powers of four or more colors in the wavelength direction may be used. The selection of the pixel of the second color is basically similar to selection in the examples described above.

Figures 15A, 15B:
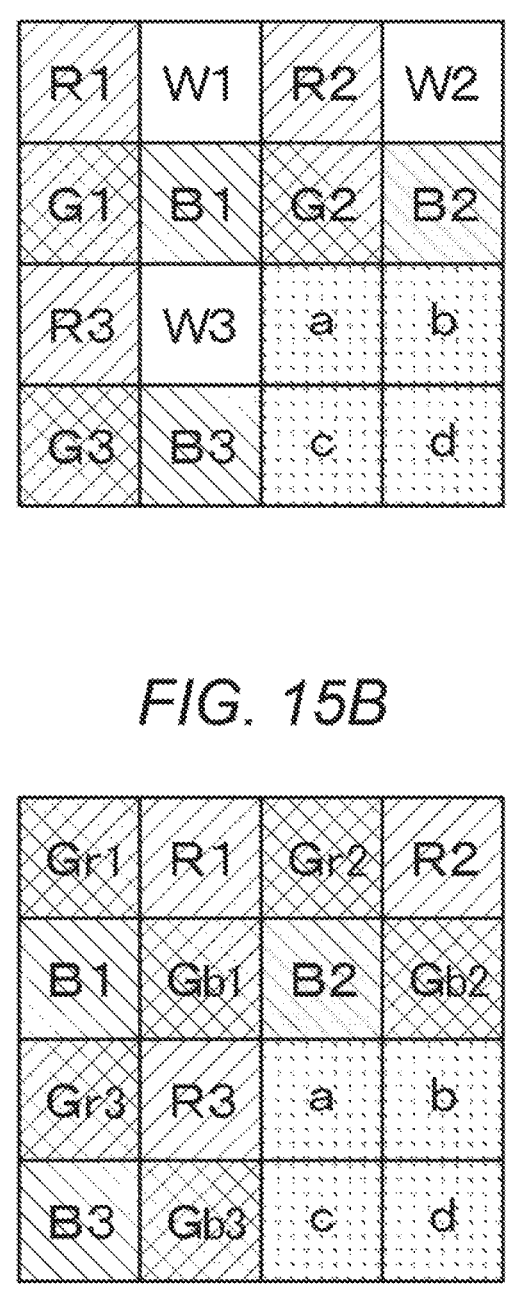

The color array illustrated in FIG. 15A is an example of a WRGB+partially multi-spectral color array, and the color array illustrated in FIG. 15B is an example of an RGB+partially multi-spectral color array. These color arrays are examples in which respective multi-spectral pixels are arranged in such a way that the number of the pixel cycles of the respective multi-spectral pixels is smaller than the number of the pixel cycles of respective WRGB pixels or respective RGB pixels. However, this is an example, and the cycle is not particularly limited, nor are the number of colors, a resolving power in the wavelength direction, and the arrangement of pixels limited to the above.

A solid-state imaging element having a multi-spectral color array (what is called a multi-spectral sensor) synthesizes a color image in some cases, but generates an image as a single-color image having each spectral characteristic in many cases. In this case, as the second color, one or more color pixels that are suitable for the spectral characteristic of the image are selected from pixels in the multi-spectral color array. In a case where different colors are selected, there is a possibility that a false color or artifacts may be generated.

For example, in the W+multi-spectral color array illustrated in FIG. 4C, in a case where a single-color image is generated from a c-color spectrum, it is desirable that the W pixel be selected as the pixel of the first color and a c-color pixel be selected as the pixel of the second color. In the RGB+multi-spectral color array illustrated in FIG. 5A, in a case where a single-color image is generated from the c-color spectrum, it is desirable that the G pixel be selected as the pixel of the first color and the c-color pixel be selected as the pixel of the second color.

The signal processing circuit 18A in Example 1 is descried below in detail. As illustrated in FIG. 7, the signal processing circuit 18A in Example 1 includes a direction determination unit 31, a blending processing unit 32, and a mosaic processing unit 33 as the luminance system, and includes a mosaic processing unit 34 and a noise removal processing unit 35 as the chromatic system.

The direction determination unit 31 determines an edge direction in which a pixel value discontinuously changes. More specifically, the direction determination unit 31 determines the edge direction in the W pixel and the G pixel of the luminance system by determining a degree of resemblance indicating how closely pixel values resemble in vertical, horizontal, and oblique directions on the basis of respective pixel values, as illustrated in FIG. 16. This direction determination does not need to be performed in all of the vertical, horizontal, and oblique directions. However, a determination accuracy can be increased by performing direction determination in all of the directions. Here, as a direction determination method, a method for performing direction determination by determining a degree of resemblance (or a degree of similarity) using the sum of squared difference (SSD) can be used, for example. However, a method using the SSD is an example, and the method using the SSD is not restrictive.

The blending processing unit 32 specifies a ratio of signal synthesis on the basis of a determination result of the direction determination unit 31, and performs blending processing on a signal of the W pixel and a signal of the G pixel at the ratio by using an alpha value a. Specifically, first, in a case where any determination result of the W pixel is selected from 8-level direction determination results in the vertical, horizontal, and oblique directions of the W pixel and the G pixel illustrated in FIG. 16, the signal of the W pixel is used as a luminance signal, and the signal of the G pixel is not used.

Furthermore, in a case where any determination result of the G pixel is selected from the direction determination results, the signal of the G pixel is used as the luminance signal. At this time, alpha blending is performed on the signal of the W pixel according to equation (1) below, and is used as the luminance signal.

$$\text{Luminance signal} = \alpha \times (G \text{ pixel signal}) + (1-\alpha) \times (W \text{ pixel signal})$$

Figure 17:
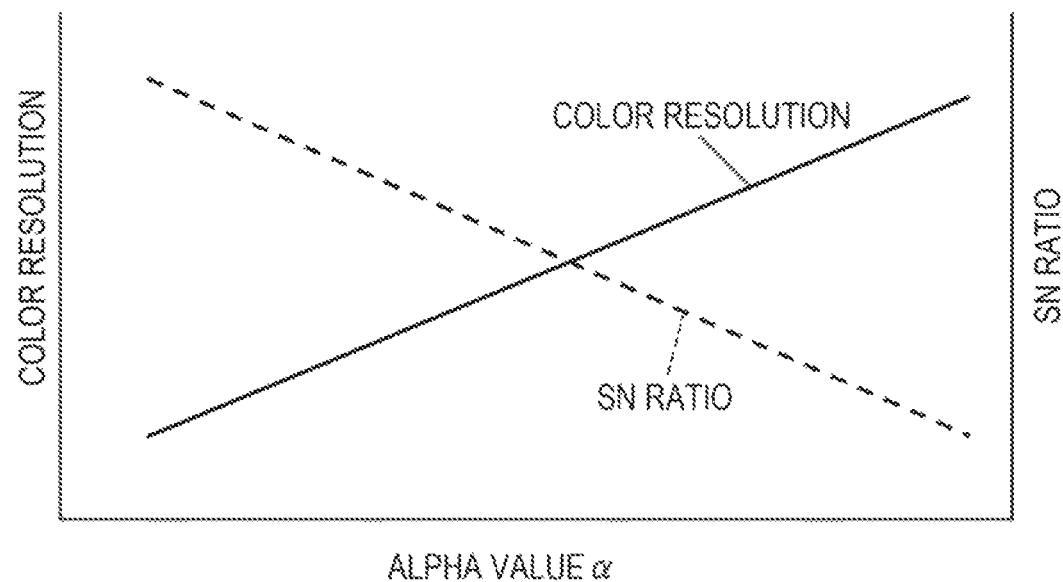
FIG. 17 illustrates a relationship between an SN ratio and a color resolution with respect to an alpha value α in alpha blending.

Here, a method for specifying the alpha value α is described. As illustrated in FIG. 17, an SN ratio and a color resolution have a trade-off relationship. In other words, when a ratio of a value of the signal of the G pixel is increased and the alpha value α is increased, the color resolution is improved, but the SN ratio deteriorates. In contrast, when a ratio of the signal of the W pixel is increased and the alpha value α is reduced, the SN ratio is improved, but the color resolution deteriorates.

Thus, when the alpha value α is specified, it is preferable that the alpha value α be appropriately adjusted and specified while a relationship between the SN ratio and the color resolution is being confirmed in an actual image. For example, in a case where the color resolution is desired to be given a first priority, the alpha value α is set in such a way that α=1, or in a case where the SN ratio is also desired to be considered, the alpha value α is set, for example, in such a way that α=0.5 or the like. Furthermore, it is desirable that these values be changed for each block in an image, and be further changed according to the type of the image, such as a scene or a gain.

The mosaic processing unit 33 performs mosaic processing for performing spatial image quality adjustment on a luminance signal after blending processing in the blending processing unit 32. Mosaic processing can be performed on respective signals of the W pixel and the G pixel, and then direction determination can be performed and blending processing can be performed. However, when mosaic processing is performed in advance, interpolation processing is performed, and therefore the accuracy of direction determination is reduced. For the reason described above, it is desirable that mosaic processing be performed on the luminance signal after blending processing.

In the signal processing of the chromatic system (a frequency component), the mosaic processing unit 34 performs mosaic processing based on respective signals of the B pixel, the R pixel, and the G pixel. In the processing of the chromatic system, color reproduction is performed, and therefore at least three or more types of pixels are needed on the basis of the principle of three primal colors of light. The WRGB color array has been used here as an example, and therefore three pixels, the B pixel, the R pixel, and the G pixel have been used. As another example, in the case of a WYeMgCy color array as a complementary color system, processing is performed on the basis of respective signals of a Ye pixel, a Mg pixel, and a C pixel.

Furthermore, in the case of the WRB (or WGB) color array, a virtual G pixel (R pixel)=W pixel (W pixel)−R pixel (G pixel)−B pixel (B pixel) is generated by using the W pixel (the W pixel), the R pixel (the G pixel), and the B pixel (the B pixel), and color reproduction is performed. Furthermore, in the case of YeRGB, the Ye pixel is used instead of the W pixel. Furthermore, in the case of a multi-spectral color array, color reproduction is performed using arbitrary three or more types of pixels.

The noise removal processing unit 35 performs noise removal processing on a signal after mosaic processing in the mosaic processing unit 34. A color pixel generally has a low sensitivity and a low SN ratio in comparison with a pixel used in the luminance system, and therefore it is desirable that noise removal processing be performed.

Finally, the synthesizing processing unit 36 synthesizes a luminance signal processed by the luminance system with a chromatic signal processed by the chromatic system, and outputs a synthesized signal as an image signal that includes a high frequency to a low frequency. Note that, in FIG. 7, an output is, for example, an image signal having the RGB Bayer array, but is not limited to this. The output may be an output of a YUV color space, an output of an RGB color space, or the like. In brief, the output may be any output that corresponds to a circuit on a rear-stage side, and is not limited to a prescribed output.

As described above, for example, in a case where the W pixel is used as the pixel of the first color and the G pixel is used as the pixel of the second color, in image processing, the W pixel and the G pixel are used in processing for determining the edge direction, and when a determination result of the G pixel is the strongest, a signal of the G pixel is used as the luminance signal. Furthermore, the SN ratio deteriorates at this time. Therefore, alpha blending can be made to be performed on luminance signals of the W pixel and the G pixel, and the alpha value α in alpha blending is set while the trade-off of the SN ratio and the color resolution is being confirmed. By doing this, even in a case where the W pixel is used in order to improve a sensitivity, a reduction in the color resolution can be minimized, and the SN ratio can be suppressed from deteriorating.

Figure 18:
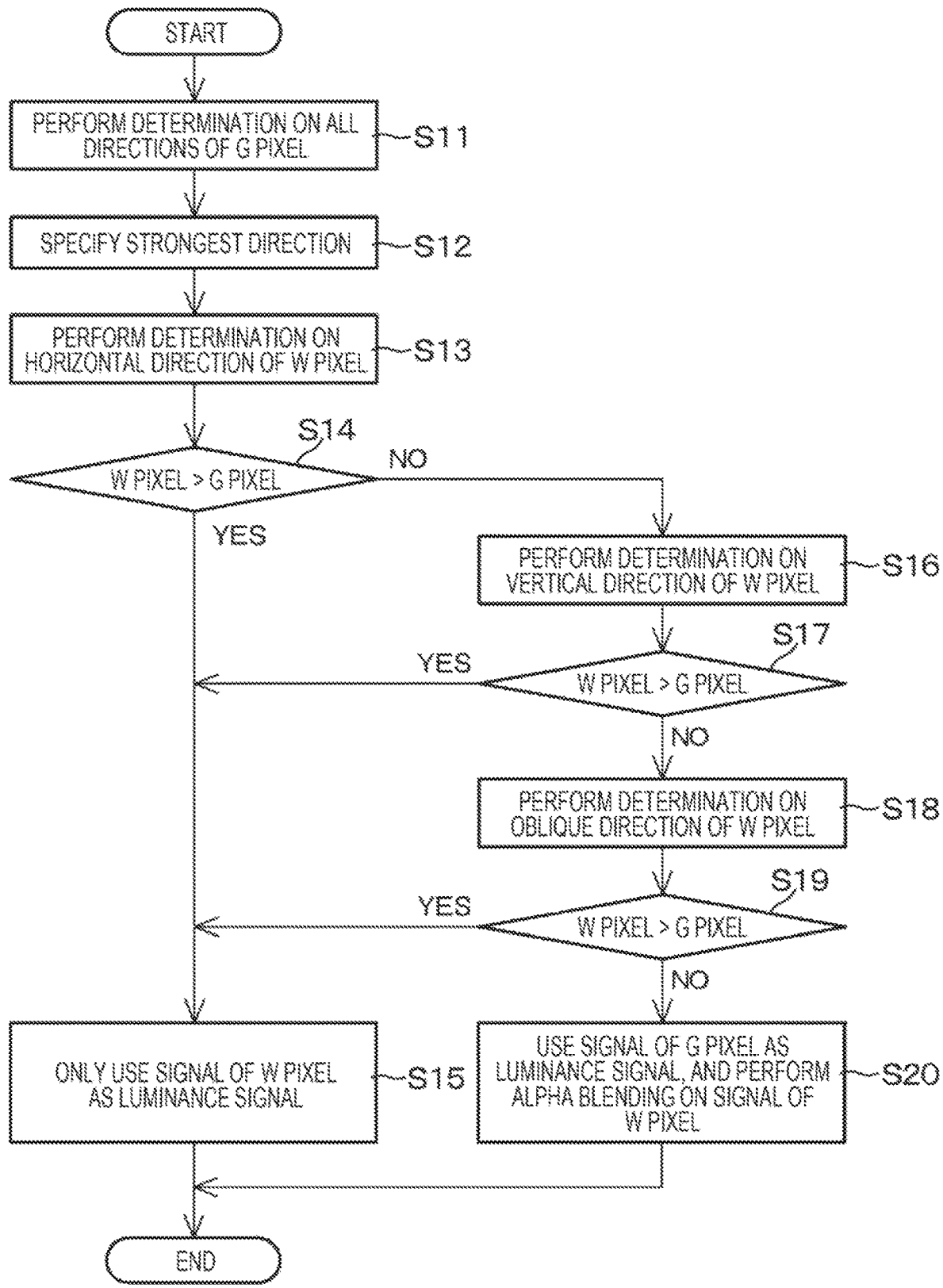
FIG. 18 is a flowchart illustrating an example of specific processing of direction determination and blending ratio specification in a direction determination unit and a blending processing unit.

An example of specific processing of direction determination and blending ratio specification in the direction determination unit 31 and the blending processing unit 32 is described below with reference to the flowchart of FIG. 18.

The direction determination unit 31 performs direction determination on all of the directions of the G pixel (step S11), next specifies the strongest direction of the G pixel (step S12), and thereafter performs direction determination on, for example, the horizontal direction of the W pixel (step S13). Next, the direction determination unit 31 determines whether or not a determination result of the horizontal direction of the W pixel is stronger than a determination result of the strongest direction of the G pixel (step S14). When it is determined that the determination result of the horizontal direction of the W pixel is stronger (YES in S14), the processing moves on to processing of the blending processing unit 32 in which only a signal of the W pixel is used as the luminance signal (step S15).

In a case where it is determined in step S14 that the determination result of the strongest direction of the G pixel is stronger than the determination result of the horizontal direction of the W pixel (NO in S14), the direction determination unit 31 performs direction determination on a vertical direction of the W pixel (step S16), and next determines whether or not a determination result of the vertical direction of the W pixel is stronger than the determination result of the strongest direction of the G pixel (step S17). In this determination processing, in a case where it is determined that the determination result of the horizontal direction of the W pixel is stronger (YES in S17), the processing moves on to step S15, and only the signal of the W pixel is used as the luminance signal.

In a case where it is determined in step S17 that the determination result of the strongest direction of the G pixel is stronger than the determination result of the horizontal direction of the W pixel (NO in S17), the direction determination unit 31 performs direction determination on an oblique direction of the W pixel (step S18), and next determines whether or not a determination result of the oblique direction of the W pixel is stronger than the determination result of the strongest direction of the G pixel (step S19). In this determination processing, in a case where it is determined that the determination result of the oblique direction of the W pixel is stronger (YES in S19), the processing moves on to step S15. In a case where it is determined that the determination result of the strongest direction of the G pixel is stronger (NO in S19), a signal of the G pixel is used as the luminance signal, and the processing moves on to processing of the blending processing unit 32 for performing alpha blending on the signal of the W pixel (step S20).

As described above, in the determination processing of the direction determination unit 31, direction determination is performed in advance on all of the directions of the G pixel, and the strongest direction is specified. Thereafter, direction determination is performed on, for example, the horizontal direction of the W pixel, and a comparison is performed with a determination result of G. At a point in time at which the W pixel is stronger, the determination processing is terminated. Then, when the G pixel is stronger, a comparison is performed with a determination result of the oblique direction of the W pixel. At a point in time at which the W pixel is stronger, the determination processing is terminated. As described above, by sequentially performing direction determination, a useless calculation may be omitted, and this enables calculation speed to be improved and also enables power consumption to be reduced.

Example 2

Figure 19:
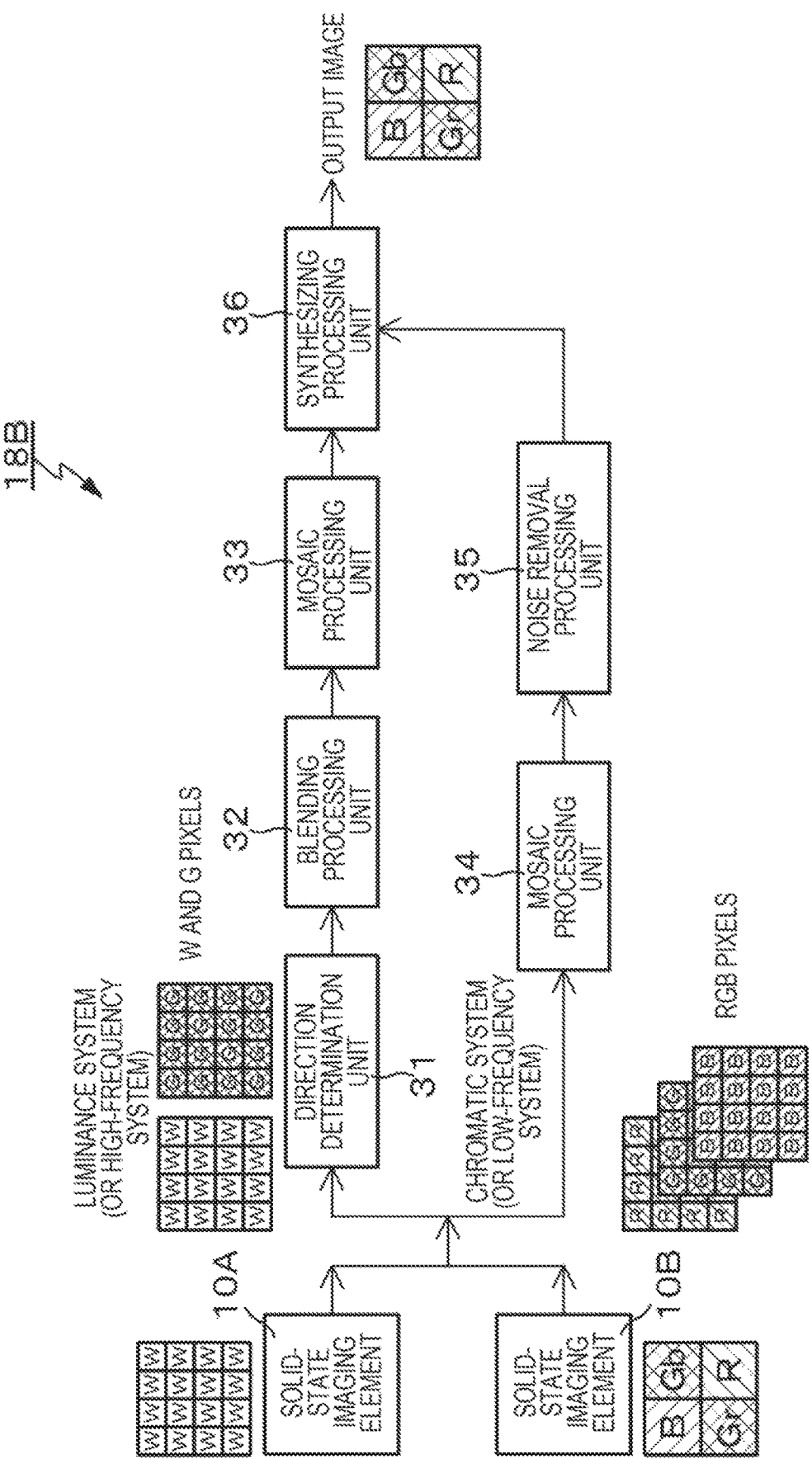
FIG. 19 is a block diagram illustrating an example of the configuration of a signal processing circuit in Example 2.
Figure 20:
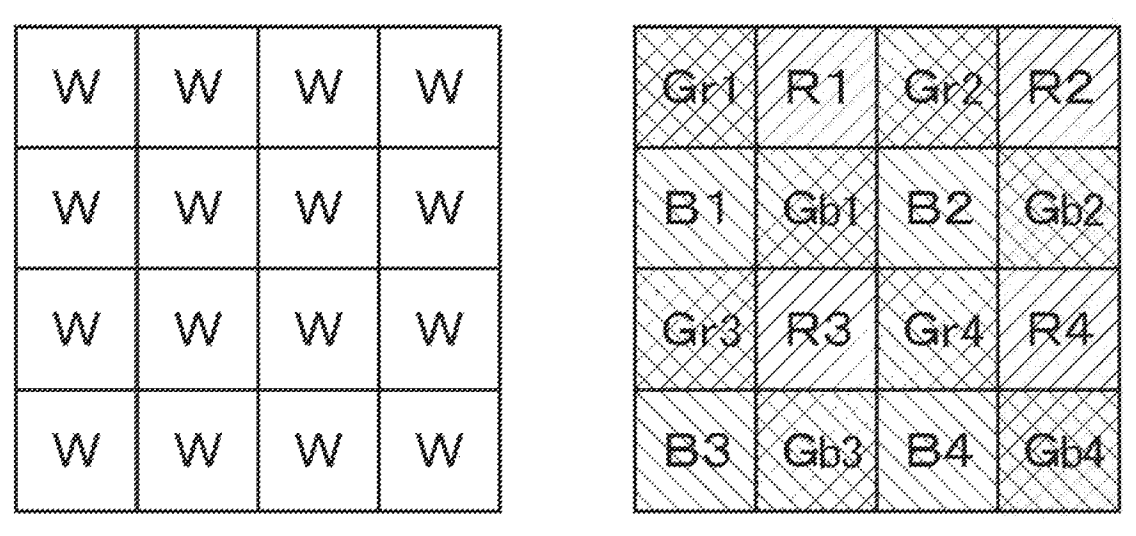

Example 2 is an example in a case where two solid-state imaging elements serving as an input sensor are used. An example of the configuration of a signal processing circuit 18B in Example 2 is illustrated in FIG. 19. Two solid-state imaging elements 10A and 10B are a combination in which one has a monochrome pixel array (all of the pixels are W pixels) and the other has an RGB Bayer array, as illustrated in FIG. 20. In this example, the W pixel is the pixel of the first color, and the G pixel is the pixel of the second color.

Figure 21:
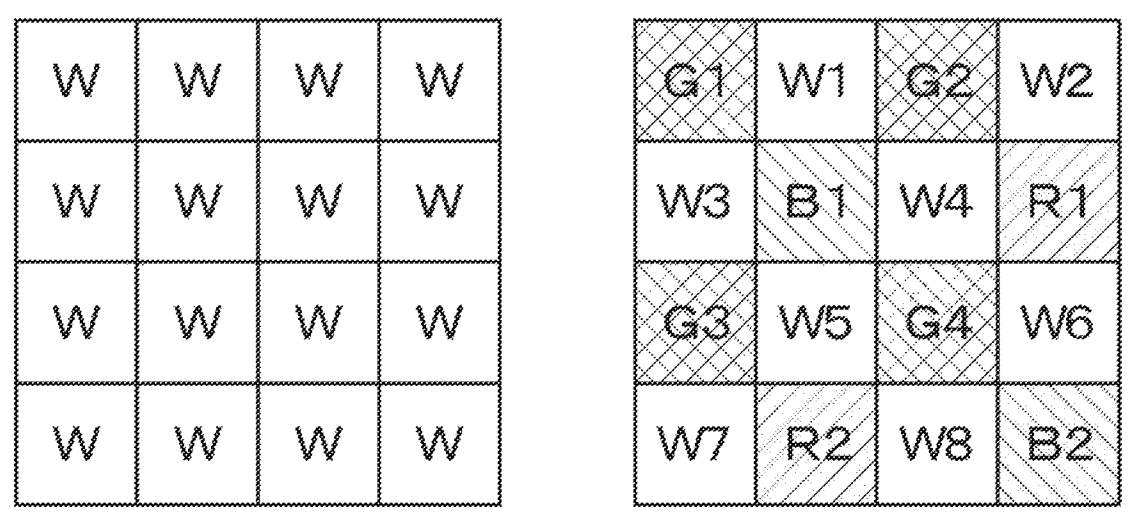
Figure 22:
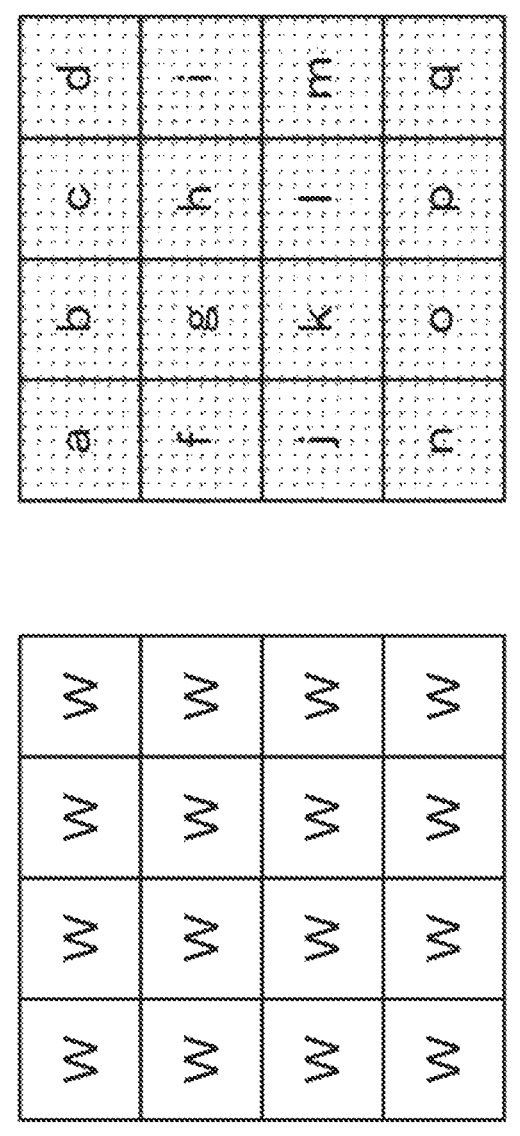

This combination is an example, and is not restrictive. For example, a combination may be employed in which one has the monochrome pixel array and the other has a WRGB color array, as illustrated in FIG. 21, or a combination may be employed in which one has the monochrome pixel array and the other has a multi-spectral color array, as illustrated in FIG. 22. All of the combinations above are obtained by dividing the pixel arrangement of each of the color arrays illustrated in Example 1 into two pieces. However, this is significantly different from the case of Example 1 in that a pixel size and the number of pixels may be different between the two solid-state imaging elements 10A and 10B.

The signal processing circuit 18B in Example 2 is different from the signal processing circuit 18A in Example 1 to which an imaging signal of a single solid-state imaging element 10 is input in that respective imaging signals of the two solid-state imaging elements 10A and 10B are synthesized and input, and processing and the like of individual components are exactly the same. Accordingly, details of processing of the individual components, in other words, the direction determination unit 31, the blending processing unit 32, and the mosaic processing unit 33 of the luminance system, and the mosaic processing unit 34 and the noise removal processing unit 35 of the chromatic system are omitted here.

Processing and the like of the individual components of the signal processing circuit 18B in Example 2 are the same as processing and the like of the signal processing circuit 18A in Example 1, and therefore operations and effects obtained by the signal processing circuit 18B in Example 2 are also the same as operations and effects obtained by the signal processing circuit 18A in Example 1. In other words, by employing the signal processing circuit 18B in Example 2, even in a case where the W pixel is used in order to improve a sensitivity, a reduction in the color resolution can be minimized, and the SN ratio can be suppressed from deteriorating.

A combination of the pixel arrays of the two solid-state imaging elements 10A and 10B is not limited to a combination of the monochrome pixel array and the RGB Bayer array, a combination of the monochrome pixel array and the WRGB color array, or a combination of the monochrome pixel array and the multi-spectral color array. For example, a combination of the RGB Bayer array and the multi-spectral color array may be employed, or a combination with a pixel that can receive infrared rays or ultraviolet rays may be employed.

Note that, in Example 1 and Example 2 described above, as an example, the W pixel is used as the pixel of the first color of the luminance system (or the high-frequency system), and the G pixel is used as the pixel of the second color. However, a combination of these colors is not restrictive. In other words, in a case where one or more pixels of a plurality of pixels having different spectral characteristics have a spectral characteristic that includes the spectral characteristics of two or more pixels that are different from the one or more pixels, when the luminance signal is generated, signals of one or more pixels that have a spectral characteristic included in the spectral characteristic of the one or more pixels are assumed to be synthesized with the luminance signal.

<Electronic Equipment of the Present Disclosure>

A solid-state imaging element according to the embodiment described above can be used as an imaging unit (an image capturing unit) in electronic equipment in general, e.g., an imaging apparatus such as a digital still camera or a video camera, a portable terminal apparatus that has an imaging function, such as a portable telephone, or a copying machine that uses a solid-state imaging element in an image reader. Note that the solid-state imaging element may be formed as one chip, or may have a module type form in which an imaging unit and a signal processing unit or an optical system are collectively packaged and that has an imaging function. The module type form described above that is mounted on electronic equipment, in other words, a camera module, is used as an imaging apparatus in some cases.

[Imaging Apparatus]

Figure 23:
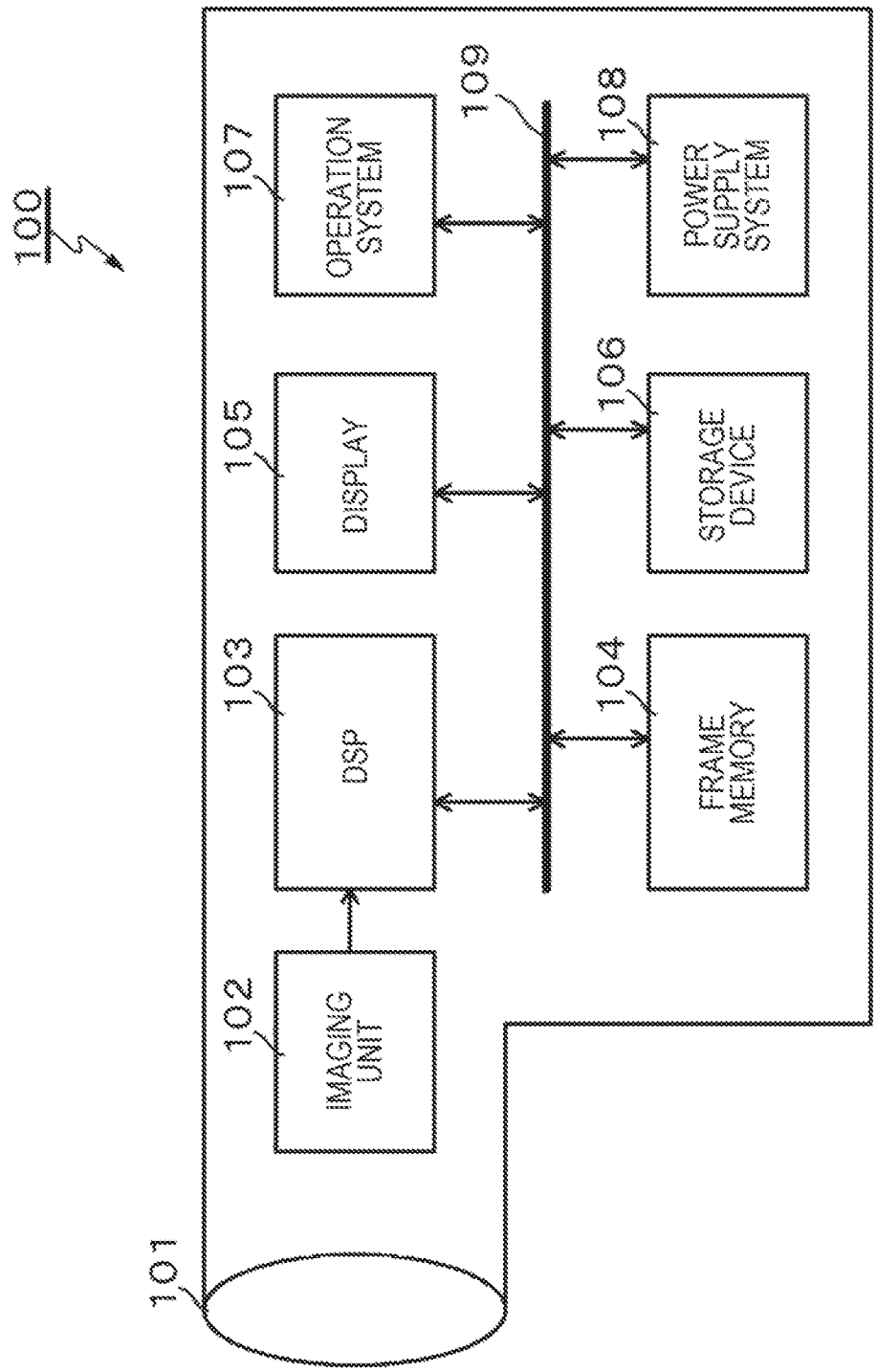
FIG. 23 is a block diagram illustrating the configuration of an imaging apparatus that is an example of electronic equipment of the present disclosure.

FIG. 23 is a block diagram illustrating the configuration of an imaging apparatus that is an example of electronic equipment of the present disclosure. As illustrated in FIG. 23, an imaging apparatus 100 in this example includes an imaging optical system 101 including a lens group or the like, an imaging unit 102, a DSP circuit 103, a frame memory 104, a display 105, a recorder 106, an operation system 107, a power supply system 108, and the like. Then, a configuration is employed in which the DSP circuit 103, the frame memory 104, the display 105, the recorder 106, the operation system 107, and the power supply system 108 are connected to each other via a bus line 109.

The imaging optical system 101 takes in incident light (image light) from a subject, and forms an image on an imaging plane of the imaging unit 102. The imaging unit 102 converts an amount of incident light for which an image has been formed on the imaging plane by the optical system 101 into an electrical signal for each pixel, and outputs the electrical signal as a pixel signal. The DSP circuit 103 performs general camera signal processing such as white balance processing, demosaic processing, gamma correction processing, or the like.

The frame memory 104 is used to appropriately store data in the process of signal processing in the DSP circuit 103. The display 105 is configured by a panel type display such as a liquid crystal display or an organic electro luminescence (EL) display, and displays a moving image or a still image that has been captured by the imaging unit 102. The recorder 106 records the moving image or the still image captured by the imaging unit 102 in a recording medium such as a portable semiconductor memory, an optical disk, or a hard disk drive (HDD).

The operation system 107 issues an operation command relating to various functions that the present imaging apparatus 100 has in accordance with an operation performed by a user. The power supply system 108 appropriately supplies various types of power serving as operation power supplies of the DSP circuit 103, the frame memory 104, the display 105, the recorder 106, and the operation system 107 to these supply targets.

In the imaging apparatus 100 having the configuration described above, the solid-state imaging element according to the embodiment described above can be used as the imaging unit 102. The solid-state imaging element according to the embodiment described above can minimize a deterioration of the color resolution even in a case where a white pixel that receives signals in all of the wavelength regions is used. Accordingly, by using the solid-state imaging element according to the embodiment described above as the imaging unit 102, a captured image having a satisfactory color resolution can be obtained even in a case where an attempt is made to improve a sensitivity by adding the white pixel.

<Configuration that the Present Disclosure can Employ>

Note that the present disclosure can also employ the configuration described below.

[1] A solid-state imaging element including:

a pixel array in which a plurality of pixels having different spectral characteristics are arranged and one or more pixels of the plurality of pixels have a spectral characteristic that includes spectral characteristics of two or more pixels that are different from the one or more pixels; and a signal processing unit that synthesizes signals of one or more pixels of the pixels that have the included spectral characteristics with a luminance signal, when a signal of a pixel that has two or more spectral characteristics in the pixel array is used to generate the luminance signal.

[2] The solid-state imaging element described in [1] described above, in which the pixel array includes at least a pixel of a first color and a pixel of a second color, and the signal processing unit synthesizes a signal of the pixel of the first color and a signal of the pixel of the second color in signal processing of a luminance system.

[3] The solid-state imaging element described in [2] described above, in which the signal processing unit performs alpha blending processing on the signal of the pixel of the first color and the signal of the pixel of the second color by using an alpha value.

[4] The solid-state imaging element described in [2] or [3] described above, in which the pixel of the first color is a white pixel that receives light in an entirety of a visible light region.

[5] The solid-state imaging element described in [2] or [3] described above, in which the pixel of the second color is a green pixel that receives green light.

[6] The solid-state imaging element described in [2] or [3] described above, in which the pixel of the second color is one or more pixels in a multi-spectral pixel array.

[7] The solid-state imaging element described in any of [1] to [6] described above, in which the signal processing unit includes a direction determination unit that determines an edge direction in which a pixel value discontinuously changes, and a ratio of a signal that will be synthesized with the luminance signal is specified on the basis of a determination result of the determination unit.

[8] The solid-state imaging element described in any of [1] to [7] described above, in which the signal processing unit performs mosaic processing after synthesizing processing performed on the luminance signal in the signal processing of the luminance system.

[9] The solid-state imaging element described in any of [1] to [8] described above, in which the pixel array includes a red pixel that receives red light, a green pixel that receives green light, and a blue pixel that receives blue light, and the signal processing unit performs mosaic processing based on respective signals of the red pixel, the green pixel, and the blue pixel in signal processing of a chromatic system.

[10] The solid-state imaging element described in [9] described above, in which the signal processing unit performs noise removal processing after the mosaic processing in the signal processing of the chromatic system.

[11] The solid-state imaging element described in any of [8] to [10] described above, in which the signal processing unit performs the synthesizing processing on a signal of the luminance system and a signal of the chromatic system.

[12] A signal processing circuit of a solid-state imaging element that includes a pixel array in which a plurality of pixels having different spectral characteristics are arranged and one or more pixels of the plurality of pixels have a spectral characteristic that includes spectral characteristics of two or more pixels that are different from the one or more pixels, in which signals of one or more pixels that have the spectral characteristics included in the spectral characteristic of the one or more pixels are synthesized with a luminance signal, when a signal of a pixel that has two or more spectral characteristics in the pixel array is processed to generate the luminance signal.

[13] The signal processing circuit described in [12] described above, in which the pixel array includes at least a pixel of a first color and a pixel of a second color, and a signal of the pixel of the first color and a signal of the pixel of the second color are synthesized in signal processing of a luminance system.

[14] The signal processing circuit described in [13] described above, in which alpha blending processing is performed on the signal of the pixel of the first color and the signal of the pixel of the second color by using an alpha value.

[15] The signal processing circuit described in [13] or [14] described above, in which the pixel of the first color is a white pixel that receives light in an entirety of a visible light region.

[16] The signal processing circuit described in [13] or [14] described above, in which the pixel of the second color is a green pixel that receives green light.

[17] The signal processing circuit described in [13] or [14] described above, in which the pixel of the second color is one or more pixels in a multi-spectral pixel array.

[18] The solid-state imaging element described in any of [12] to [17] described above, in which an edge direction in which a pixel value discontinuously changes is determined, and a ratio of a signal that will be synthesized with the luminance signal is specified on the basis of a result of determination.

[19] A signal processing circuit that processes an output signal of a first solid-state imaging element and an output signal of a second solid-state imaging element, the first solid-state imaging element being configured by arranging pixels of a first color, the second solid-state imaging element being configured by arranging pixels of a second color, in which, when a luminance signal is generated, signals of the pixels of the first color and signals of the pixels of the second color are synthesized, the signals of the pixels of the first color being output from the first solid-state imaging element, the signals of the pixels of the second color being output from the second solid-state imaging element.

[20] Electronic equipment that includes a solid-state imaging element,
in which the solid-state imaging element includes:
a pixel array in which a plurality of pixels having different spectral characteristics are arranged and one or more pixels of the plurality of pixels have a spectral characteristic that includes spectral characteristics of two or more pixels that are different from the one or more pixels; and
a signal processing unit that synthesizes signals of one or more pixels of the pixels that have the included spectral characteristics with a luminance signal, when a signal of a pixel that has two or more spectral characteristics in the pixel array is used to generate the luminance signal.

REFERENCE SIGNS LIST 10, 10A, 10B Solid-state imaging element
11 Pixel array
12 Vertical driving unit
13 Column processing unit
14 Vertical driving unit
15 System controller
16 ($16_1$ to $16_m$) Pixel driving line
17 ($17_1$ to $17_n$) Vertical signal line
18 Signal processing unit
18A Signal processing circuit in Example 1
18B Signal processing circuit in Example 2
19 Data storage
20 Pixel (unit pixel)
31 Direction determination unit
32 Blending processing unit
33, 34 Mosaic processing unit
35 Noise removal processing unit
36 Synthesizing processing unit

The invention claimed is:

1. A solid-state imaging element, comprising:
a pixel array including a plurality of pixels, wherein
the plurality of pixels includes a first pixel and a second pixel,
the first pixel has a spectral characteristic that includes spectral characteristics of two or more pixels of the plurality of pixels, and
the two or more pixels are different from the first pixel and includes the second pixel; and
a signal processing unit configured to:
determine a degree of similarity of pixel values in each of at least one edge direction of the first pixel and a plurality of edge directions of the second pixel;
determine a specific edge direction of the plurality of edge directions of the second pixel having a highest degree of similarity of pixel values among the plurality of edge directions;
compare the degree of similarity of pixel values in the at least one edge direction of the first pixel with the highest degree of similarity of pixel values in the specific edge direction of the second pixel;
select one of a signal of the first pixel or a signal of the second pixel as a luminance signal based on a result of the comparison; and
execute a synthesizing process to one of:
synthesize the signal of the first pixel with the luminance signal based on the selection of the signal of the second pixel as the luminance signal; or
synthesize the signal of the second pixel with the luminance signal based on the selection of the signal of the first pixel as the luminance signal.

2. The solid-state imaging element according to claim 1, wherein
the first pixel is of a first color, and
the second pixel is of a second color.

3. The solid-state imaging element according to claim 2, wherein the signal processing unit is further configured to:
execute an alpha blending process on the signal of the first pixel of the first color and the signal of the second pixel of the second color based on an alpha value in accordance with the selection of the luminance signal; and
determine a ratio of the signal of the first pixel to be synthesized with the luminance signal based on the selection of the luminance signal of the second pixel.

4. The solid-state imaging element according to claim 2, wherein
the first pixel is a white pixel, and
the first pixel is configured to receive light in an entirety of a visible light region.

5. The solid-state imaging element according to claim 2, wherein
the second pixel is a green pixel, and
the second pixel is configured to receive green light.

6. The solid-state imaging element according to claim 2, wherein the second pixel of the second color is at least one pixel in a multi-spectral pixel array.

7. The solid-state imaging element according to claim 1, wherein
the signal processing unit further includes:
a direction determination unit, a blending processing unit, a first mosaic processing unit, and a synthesizing processing unit that constitutes a luminance system; and
a second mosaic processing unit and a noise removal processing unit that constitutes a chromatic system, and
the first mosaic processing unit is further configured to execute a mosaic process after the execution of the synthesizing process.

8. The solid-state imaging element according to claim 1, wherein
the signal processing unit further includes a second mosaic processing unit and a noise removal processing unit,
the second mosaic processing unit and the noise removal processing unit of the signal processing unit constitutes a chromatic system,
the plurality of pixels of the pixel array further includes:
a red pixel configured to receive red light;
a green pixel configured to receive green light; and
a blue pixel configured to receive blue light, and
the second mosaic processing unit is configured to execute a mosaic process based on respective signals of the red pixel, the green pixel, and the blue pixel.

9. The solid-state imaging element according to claim 8, wherein the noise removal processing unit is configured to execute a noise removal process after the execution of the mosaic process.

10. The solid-state imaging element according to claim 7, wherein the signal processing unit is further configured to execute performs the synthesizing process on the luminance signal of the luminance system and a chromatic signal of the chromatic system.

11. The solid-state imaging element according to claim 1, wherein the plurality of edge directions includes a vertical direction, a horizontal direction, and an oblique direction.

12. The solid-state imaging element according to claim 1, wherein the signal processing unit is further configured to:
select the signal of the first pixel based on the result of the comparison that indicates that the degree of similarity of pixel values in the at least one edge direction of the first pixel is higher than the highest degree of similarity of pixel values in the specific edge direction of the second pixel; and
select the signal of the second pixel based on the result of the comparison that indicates that the highest degree of similarity of pixel values in the specific edge direction of the second pixel is higher than the degree of similarity of pixel values in the at least one edge direction of the first pixel.

13. A signal processing circuit of a solid-state imaging element, the signal processing circuit comprising:
a signal processing unit configured to:
process signals of the solid-state imaging element, wherein
the solid-state imaging element includes a pixel array including a plurality of pixels,
the plurality of pixels includes a first pixel and a second pixel,
the first pixel has a spectral characteristic that includes spectral characteristics of two or more pixels of the plurality of pixels, and
the two or more pixels are different from the first pixel and includes the second pixel;
determine a degree of similarity of pixel values in each of at least one edge direction of the first pixel and a plurality of edge directions of the second pixel;
determine a specific edge direction of the plurality of edge directions of the second pixel having a highest degree of similarity of pixel values among the plurality of edge directions;
compare the degree of similarity of pixel values in the at least one edge direction of the first pixel with the highest degree of similarity of pixel values in the specific edge direction of the second pixel;
select one of a signal of the first pixel or a signal of the second pixel as a luminance signal based on a result of the comparison; and
execute a synthesizing process to one of:
synthesize the signal of the first pixel with the luminance signal based on the selection of the signal of the second pixel as the luminance signal, or
synthesize the signal of the second pixel with the luminance signal based on the selection of the signal of the first pixel as the luminance signal.

14. The signal processing circuit according to claim 13, wherein
the first pixel is of a first color, and
the second pixel is of a second color.

15. The signal processing circuit according to claim 14, wherein the signal processing unit is further configured to:
execute an alpha blending process on the signal of the first pixel of the first color and the signal of the second pixel of the second color based on an alpha value in accordance with the selection of the luminance signal; and
determine a ratio of the signal of the first pixel to be synthesized with the luminance signal based on the selection of the luminance signal of the second pixel.

16. The signal processing circuit according to claim 14, wherein
the first pixel of the first color is a white pixel, and
the first pixel receives light in an entirety of a visible light region.

17. The signal processing circuit according to claim 14, wherein
the second pixel of the second color is a green pixel, and
the second pixel receives green light.

18. The signal processing circuit according to claim 14, wherein
the second pixel of the second color is at least one pixel in a multi-spectral pixel array.

19. A signal processing circuit, comprising:
circuitry configured to:
process an output signal of a first solid-state imaging element and an output signal of a second solid-state imaging element, wherein the first solid-state imaging element includes a first pixel of a first color, and the second solid-state imaging element includes a second pixel of a second color;
determine a degree of similarity of pixel values in each of at least one edge direction of the first pixel and a plurality of edge directions of the second pixel;
determine a specific edge direction of the plurality of edge directions of the second pixel having a highest degree of similarity of pixel values among the plurality of edge directions;
compare the degree of similarity of pixel values in the at least one edge direction of the first pixel with the highest degree of similarity of pixel values in the specific edge direction of the second pixel;
select one of a signal of the first pixel or a signal of the second pixel as a luminance signal based on a result of the comparison; and
execute a synthesizing process to one of:
synthesize the signal output from the first pixel of the first color with the luminance signal of the second pixel of the second color based on the selection of the signal of the second pixel as the luminance signal, or
synthesize the signal output from the second pixel of the second color with the luminance signal of the first pixel of the first color based on the selection of the signal of the first pixel as the luminance signal.

20. An electronic equipment, comprising:
a solid-state imaging element, wherein the solid-state imaging element includes:
a pixel array including a plurality of pixels, wherein
the plurality of pixels includes a first pixel and a second pixel,
the first pixel has a spectral characteristic that includes spectral characteristics of two or more pixels of the plurality of pixels,
the two or more pixels are different from the first pixel and includes the second pixel; and
a signal processing unit configured to:
determine a degree of similarity of pixel values in each of at least one edge direction of the first pixel and a plurality of edge directions of the second pixel;

determine a specific edge direction of the plurality of edge directions of the second pixel having a highest degree of similarity of pixel values among the plurality of edge directions;

compare the degree of similarity of pixel values in the at least one edge direction of the first pixel with the highest degree of similarity of pixel values in the specific edge direction of the second pixel;

select one of a signal of the first pixel or a signal of the second pixel as a luminance signal based on a result of the comparison; and execute a synthesizing process to one of
- synthesize the signal of the first pixel with the luminance signal based on the selection of the signal of the second pixel as the luminance signal, or
- synthesize the signal of the second pixel with the luminance signal based on the selection of the signal of the first pixel as the luminance signal.

* * * * *